United States Patent
Shimmerlik et al.

(10) Patent No.: US 11,527,124 B2
(45) Date of Patent: *Dec. 13, 2022

(54) SYSTEMS, METHODS, AND APPARATUS FOR FACILITATING MODULE-BASED VENDING

(71) Applicant: Vengo Inc., Long Island City, NY (US)

(72) Inventors: Brian Shimmerlik, New York, NY (US); Steven Bofill, Bethpage, NY (US); Brian Bofill, Bethpage, NY (US); Jafar Mohammed, Sanford, FL (US); Adam Gartenberg, New York, NY (US)

(73) Assignee: Vengo Inc., Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,794

(22) Filed: Nov. 10, 2020

(65) Prior Publication Data

US 2021/0065491 A1   Mar. 4, 2021

Related U.S. Application Data

(63) Continuation of application No. 16/299,947, filed on Mar. 12, 2019, now Pat. No. 10,832,511, which is a
(Continued)

(51) Int. Cl.
  *G07F 11/54* (2006.01)
  *G07F 11/00* (2006.01)
  (Continued)

(52) U.S. Cl.
  CPC ......... *G07F 11/004* (2020.05); *B60P 3/0257* (2013.01); *G06Q 20/18* (2013.01);
  (Continued)

(58) Field of Classification Search
  CPC .......... G07F 9/105; G07F 9/10; G07F 7/0609; G07F 11/26; G07F 11/38
  See application file for complete search history.

(56) References Cited

U.S. PATENT DOCUMENTS 2,665,184 A   1/1954   Hord
3,090,521 A   5/1963   Fazekas
(Continued)

FOREIGN PATENT DOCUMENTS

CA           2353253 A1     1/2002
CN    ZL 201480075204.X     6/2018
(Continued)

OTHER PUBLICATIONS

Written Opinion for Application No. PCT/US2014/071433 dated May 29, 2015; 12 pps.
(Continued)

*Primary Examiner* — Timothy R Waggoner
(74) *Attorney, Agent, or Firm* — Michael Downs; Downs IP Law LLC

(57) ABSTRACT

Systems, apparatus, methods, and articles of manufacture provide for modular vending systems utilizing reloadable product dispensing modules, including, but not limited to, vertical product dispensing modules comprising a vertical conveyor and a mounting structure for releasably engaging with module holder structures of modular vending machines, and a central controller device for communicating with a plurality of modular vending machines.

16 Claims, 13 Drawing Sheets

Related U.S. Application Data continuation of application No. 15/451,400, filed on Mar. 6, 2017, now Pat. No. 10,229,551, which is a continuation of application No. 14/516,563, filed on Oct. 16, 2014, now Pat. No. 9,589,411, which is a continuation-in-part of application No. 13/830,691, filed on Mar. 14, 2013, now Pat. No. 9,336,545.

(60) Provisional application No. 61/919,091, filed on Dec. 20, 2013, provisional application No. 61/764,823, filed on Feb. 14, 2013, provisional application No. 61/613,769, filed on Mar. 21, 2012.

(51) Int. Cl.
| | |
|---|---|
| *G06Q 30/02* | (2012.01) |
| *G07F 9/10* | (2006.01) |
| *G06Q 20/18* | (2012.01) |
| *G07F 11/36* | (2006.01) |
| *G07F 11/04* | (2006.01) |
| *B60P 3/025* | (2006.01) |
| *G07F 9/00* | (2006.01) |

(52) U.S. Cl.
CPC ..... *G06Q 30/0207* (2013.01); *G06Q 30/0259* (2013.01); *G06Q 30/0266* (2013.01); *G07F 9/001* (2020.05); *G07F 9/002* (2020.05); *G07F 9/009* (2020.05); *G07F 9/10* (2013.01); *G07F 11/04* (2013.01); *G07F 11/36* (2013.01); *G07F 11/54* (2013.01)

(56) References Cited

U.S. PATENT DOCUMENTS

| | | | |
|---|---|---|---|
| 3,172,713 A * | 3/1965 | Paul | G07F 9/10 |
| | | | 219/214 |
| 3,204,816 A | 9/1965 | Johannes | |
| 3,486,658 A | 12/1969 | Cheslak et al. | |
| 3,831,807 A | 8/1974 | Deaton et al. | |
| 3,938,699 A | 2/1976 | Wittern et al. | |
| 4,043,483 A | 8/1977 | Gore et al. | |
| 4,222,528 A | 9/1980 | Smith | |
| 4,560,088 A | 12/1985 | Tan | |
| 4,757,915 A | 7/1988 | Albright et al. | |
| 5,163,581 A | 11/1992 | Lombardi, Jr. | |
| 5,333,754 A * | 8/1994 | Kobayashi | G07F 11/04 |
| | | | 221/150 R |
| 5,458,260 A | 10/1995 | Sainato et al. | |
| 5,509,573 A | 4/1996 | Campoli | |
| 5,588,555 A * | 12/1996 | Kanamori | G01N 1/2813 |
| | | | 221/197 |
| 5,611,456 A | 3/1997 | Kasper | |
| 5,649,641 A | 7/1997 | Campoli | |
| 5,651,476 A | 7/1997 | Percy et al. | |
| 5,753,897 A | 5/1998 | Kasper | |
| 5,829,631 A | 11/1998 | Kasper | |
| 5,956,876 A | 9/1999 | Burdette et al. | |
| 5,971,205 A * | 10/1999 | Michaels | G07F 9/105 |
| | | | 221/135 |
| 5,996,838 A | 12/1999 | Bayer et al. | |
| 6,234,345 B1 | 5/2001 | Minh et al. | |
| 6,330,958 B1 | 12/2001 | Ruskin et al. | |
| 6,367,653 B1 * | 4/2002 | Ruskin | G07F 9/026 |
| | | | 221/1 |
| 6,571,150 B2 | 5/2003 | Arai et al. | |
| 6,609,103 B1 | 8/2003 | Kolls | |
| 6,814,256 B2 | 11/2004 | Clark | |
| 6,959,230 B1 | 10/2005 | Leibu et al. | |
| 7,277,776 B2 | 10/2007 | Kim | |
| 7,357,314 B2 | 4/2008 | Kusakawa | |
| 7,395,946 B2 * | 7/2008 | Yuyama | B65B 35/08 |
| | | | 221/265 |
| 7,584,868 B2 * | 9/2009 | Bauch | B65G 33/04 |
| | | | 221/197 |
| 7,720,599 B2 | 5/2010 | Miyawaki et al. | |
| 7,735,681 B2 | 6/2010 | Handfeld et al. | |
| 7,787,988 B2 | 8/2010 | Whitten et al. | |
| 7,793,797 B2 | 9/2010 | Jarisch et al. | |
| 8,132,691 B2 | 3/2012 | Black, Jr. et al. | |
| 8,191,779 B2 | 6/2012 | Illingworth et al. | |
| 8,271,128 B1 | 9/2012 | Schultz | |
| 8,567,639 B2 | 10/2013 | Kim | |
| 8,655,485 B2 | 2/2014 | Garber et al. | |
| 8,712,585 B2 | 4/2014 | Bruck | |
| 9,336,545 B2 | 5/2016 | Shimmerlik et al. | |
| 9,589,411 B2 | 3/2017 | Shimmerlik et al. | |
| 9,589,412 B2 | 3/2017 | Shimmerlik et al. | |
| 10,229,551 B2 | 3/2019 | Shimmerlik et al. | |
| 10,832,511 B2 | 11/2020 | Shimmerlik et al. | |
| 2001/0000610 A1 | 5/2001 | Johnson | |
| 2002/0007868 A1 * | 1/2002 | Kodama | B65B 5/103 |
| | | | 141/104 |
| 2004/0050855 A1 | 3/2004 | Jurgenson | |
| 2004/0193310 A1 | 9/2004 | Clark | |
| 2004/0249502 A1 | 12/2004 | Truong et al. | |
| 2005/0162403 A1 | 7/2005 | Kim | |
| 2006/0016825 A1 | 1/2006 | Bauch et al. | |
| 2006/0184271 A1 | 8/2006 | Loveless | |
| 2010/0138037 A1 | 6/2010 | Adelberg et al. | |
| 2011/0071669 A1 | 3/2011 | Garber et al. | |
| 2012/0006204 A1 | 1/2012 | Eidenschink et al. | |
| 2012/0043345 A1 | 2/2012 | Garber et al. | |
| 2012/0059511 A1 | 3/2012 | Majer | |
| 2013/0043271 A1 | 2/2013 | South et al. | |
| 2016/0247212 A1 | 8/2016 | Shimmerlik et al. | |
| 2017/0228958 A1 | 8/2017 | Shimmerlik et al. | |

FOREIGN PATENT DOCUMENTS

| | | |
|---|---|---|
| EP | 0585699 A1 | 3/1994 |
| JP | 9035139 | 2/1997 |
| WO | WO03024742 A2 | 3/2003 |
| WO | WO2007054636 | 5/2007 |
| WO | WO 2015/095669 | 6/2015 |

OTHER PUBLICATIONS

International Search Report for Application No. PCT/US2014/071433 dated May 29, 2015; 4 pps.

Office Action for U.S. Appl. No. 13/830,691 dated Dec. 12, 2014; 8 pps.

Final Office Action for U.S. Appl. No. 13/830,691 dated Jul. 10, 2015; 11 pps.

Office Action for U.S. Appl. No. 13/830,691 dated Dec. 22, 2015; 7 pps.

Notice of Allowance for U.S. Appl. No. 13/830,691 dated Feb. 4, 2016; 5 pps.

Office Action for U.S. Appl. No. 14/516,563 dated Feb. 18, 2016; 13 pps.

Final Office Action for U.S. Appl. No. 14/516,563 dated Jul. 7, 2016; 15 pps.

Notice of Allowance for U.S. Appl. No. 14/516,563 dated Jan. 18, 2017; 8 pps.

Office Action for U.S. Appl. No. 14/143,470 dated Nov. 23, 2016; 12 pps.

Final Office Action for U.S. Appl. No. 14/143,470 dated May 30, 2017; 8 pps.

Office Action for U.S. Appl. No. 14/516,565 dated Mar. 4, 2016; 10 pps.

Final Office Action for U.S. Appl. No. 14/516,565 dated Jul. 5, 2016; 13 pps.

Notice of Allowance for U.S. Appl. No. 14/516,565 dated Jan. 17, 2017; 8 pps.

International Preliminary Report on Patentability for Application No. PCT/US2014/071433 dated Jun. 21, 2016; 8 pps.

Office Action for U.S. Appl. No. 15/425,625 dated May 9, 2017; 8 pps.

Office Action for U.S. Appl. No. 15/425,625 dated Sep. 5, 2017; 8 pps.

(56) References Cited

OTHER PUBLICATIONS

Office Action for U.S. Appl. No. 15/451,400 dated Apr. 12, 2018; 10 pps.
Notice of Allowance for U.S. Appl. No. 15/451,400 dated Oct. 24, 2018; 8 pps.
Notice of Allowance for U.S. Appl. No. 15/451,400 dated Nov. 16, 2018; 5 pps.
Office Action for U.S. Appl. No. 16/299,947 dated Jun. 21, 2019; 10 pps.
Final Office Action for U.S. Appl. No. 16/299,947 dated Jan. 14, 2020; 11 pps.
Notice of Allowance for U.S. Appl. No. 16/299,947 dated Jul. 6, 2020; 5 pps.
Office Action for Application No. 20180708263.6 dated Sep. 3, 2020; 11 pps.

\* cited by examiner

SYSTEMS, METHODS, AND APPARATUS FOR FACILITATING MODULE-BASED VENDING

CROSS-REFERENCE TO RELATED APPLICATIONS

The present application claims the benefit of priority of U.S. Provisional Patent Application No. 61/919,091 filed Dec. 20, 2013, entitled "VENDING SYSTEMS, METHODS, AND APPARATUS UTILIZING PRODUCT CARTRIDGES," which is incorporated by reference in the present application.

The present application is a continuation-in-part of U.S. patent application Ser. No. 13/830,691 filed Mar. 14, 2013, entitled "VENDING MACHINE AND METHODS FOR VENDING ITEMS"; which claims the benefit of priority of: (i) U.S. Provisional Patent Application No. 61/764,823 filed Feb. 14, 2013, entitled "MODULAR VENDING MACHINE WITH RELOADABLE CARTRIDGE SYSTEM"; and (ii) U.S. Provisional Patent Application No. 61/613,769 filed Mar. 21, 2012, entitled "TAXI TREATS". Each of the applications identified above is incorporated by reference in the present application.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

A. Introduction

Figure 1:
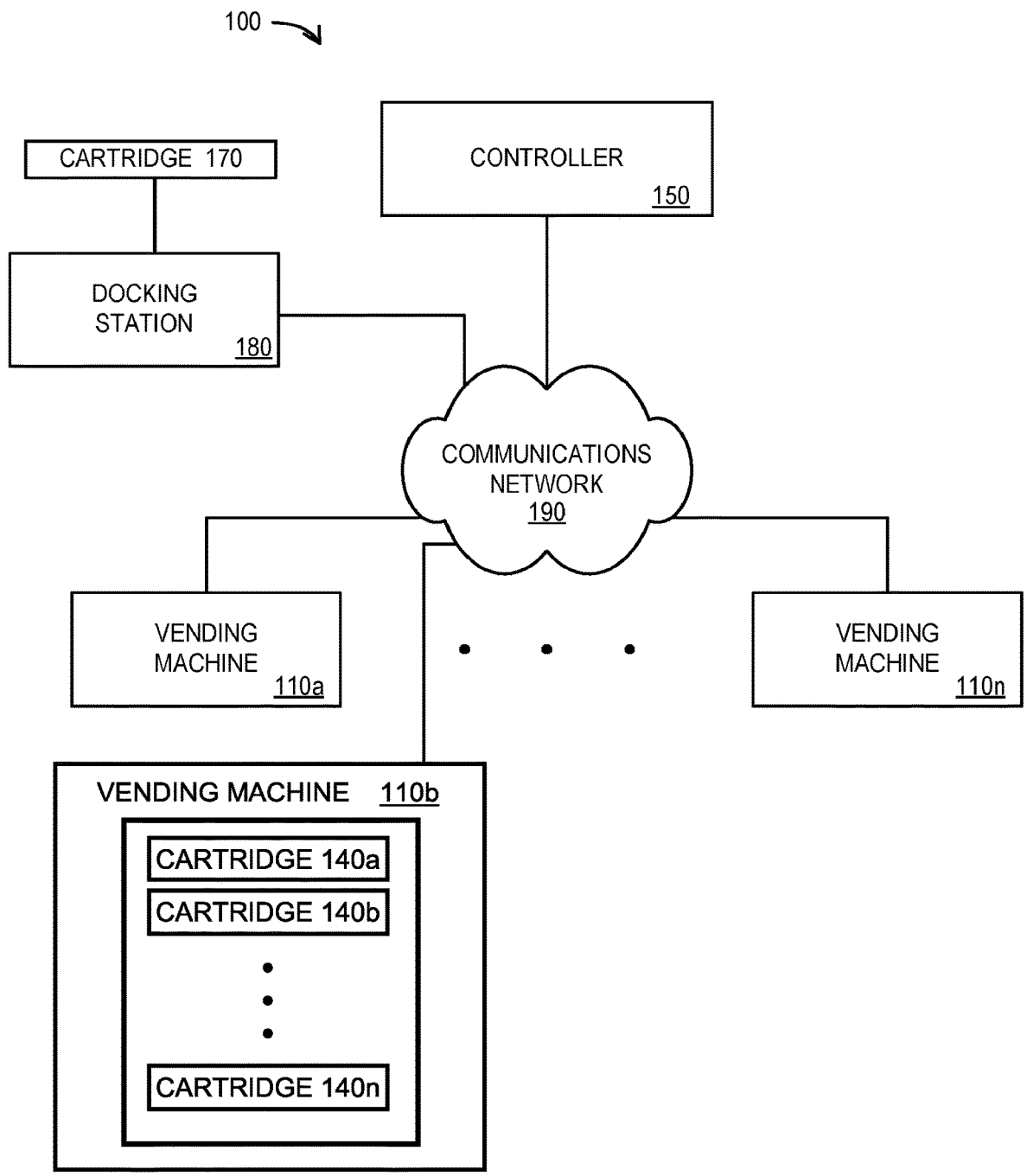
FIG. 1 is a diagram of a system according to an embodiment of the present invention.

Some embodiments of the present invention provide for vending systems utilizing reloadable product dispensing modules (also referred to as "product cartridges", "cartridges" or "product dispensing cartridges" in this disclosure). In one example, products may be loaded into product dispensing modules, which may then be installed into a vending machine. Such systems advantageously provide for easier and more efficient stocking of vending machines.

Some embodiments of the present invention provide for a reloadable product dispensing module facilitating easier transportation of the product dispensing module, improved security of the product in the product dispensing module and/or the product dispensing module itself, and/or more efficient loading of the product dispensing module in a vending machine.

According to some embodiments of the present invention, a vending machine system is provided wherein one or more components of the vending machine may be installed into, removed from and/or replaced in a vending machine. Such a vending machine system may be referred to in this disclosure as a "modular vending machine system." According to some embodiments, such components of a modular vending machine system may include, but are not limited to, one or more of: a release mechanism to vend products, a motor (e.g., to drive the release mechanism), a connection (e.g., an electrical connection) from a motor and a release mechanism, a connection between a motor and the vending machine, and/or any combination of the foregoing components. In one example, products for dispensing via a vending machine may be pre-packaged into the cartridge, and the cartridge may be replaceably coupled or otherwise releasably secured to a frame of a vending machine (e.g., for dispensing products from the cartridge in exchange for payment by a vending customer).

According to some embodiments, a product dispensing module is provided (e.g., for use in a modular vending machine system) that comprises one or more of: a vertical conveyor comprising a plurality of product supporting positions in a substantially vertical arrangement (e.g., a helical coil, a vertical configuration of conveyor platforms); a container connected to the vertical conveyor, the container comprising at least one side wall configured to retain products in the product supporting positions of the vertical conveyor; a coupler connected to the vertical conveyor, the coupler being configured for coupling with a drive assembly (e.g., a motor and/or drive shaft) for operating the vertical conveyor.

According to some embodiments, a product dispensing module may further comprise a coupler lock (e.g., attached to the container). In one or more embodiments, the coupler lock is configured to substantially prevent movement of the coupler and/or the vertical conveyor. For example, the coupler lock may lock the coupler from moving when the coupler is not coupled to a drive assembly (e.g., of a vending machine) for operating the vertical conveyor. The coupler lock may also be configured to allow movement of the coupler and/or the vertical conveyor to dispense products (e.g., when the coupler is coupled to a drive assembly of a vending machine for operating the vertical conveyor in order to dispense purchased products to customers). According to some embodiments, the ability to secure the coupler and/or vertical conveyor may provide for more secure handling of products in the product dispensing module.

According to some embodiments, a cartridge or module for dispensing products vertically in a vending machine is provided, the cartridge comprising one or more of: a first side panel and a second side panel; a rear panel connected to the first side panel along a first edge of the rear panel and connected to the second side panel along a second edge of the rear panel that is opposite the first edge; and a cartridge coupler mechanism, connected to respective top edges of the first side panel, the second side panel and the rear panel. In some embodiments, the cartridge coupler mechanism may comprise one or more of: a rotatable coupler, a coupler housing, and a vertical dispensing coil connected to the rotatable coupler.

In one embodiment, the cartridge module further comprises a motor (e.g., a stepper motor connected to the vertical dispensing coil). In a different embodiment, the cartridge module does not comprise a motor (e.g., a motor for driving the vertical dispensing coil may be included in the cabinet of a modular vending machine).

In one embodiment, the coupler housing may comprise a coupler lock so that when in a first position, it secures the coupler from rotating, and, when in a second position, it allows the coupler to rotate.

According to some embodiments, a system for dispensing products is provided, the system comprising: (i) a product dispensing module comprising a conveyor with a plurality of product supporting positions, a container connected to the conveyor, and a module coupler connected to the vertical conveyor; and (ii) a vending unit comprising at least one drive assembly for coupling with and/or operating a product dispensing module, and a controller device configured to control operation of the drive assembly (e.g., to vend a purchased product from a product dispensing module coupled with the vending unit). In one embodiment, the container comprises at least one wall configured to retain products in the product supporting positions of the vertical conveyor. In one embodiment, the product supporting positions are arranged in a substantially vertical arrangement (e.g., for dispensing and/or raising products to a product retrieval area on purchase). In one embodiment, the module coupler is configured to couple with a drive coupler of a vending unit (e.g., to allow for a drive assembly to operate conveyor). According to some embodiments, one or more product dispensing modules may be installed in the vending unit.

According to some embodiments, the product dispensing module may comprise a module coupler lock attached to the container to substantially prevent movement of the module coupler and/or the conveyor. In one embodiment, the module coupler lock may be configured to substantially prevent movement of the module coupler and/or the vertical conveyor when the module coupler is not coupled to the drive coupler, and/or the module coupler lock may be configured to allow movement of the module coupler and/or the vertical conveyor (e.g., to dispense products) when the module coupler is coupled to the drive coupler.

A modular vending machine system, in accordance with one or more of the embodiments described in this disclosure, may advantageously provide for one or more benefits, including a speed of restocking the vending machine. In one or more embodiments, if the release mechanism and storage housing for a vended product were interchangeable (e.g., as embodied in a reloadable product dispensing module), the restocking of the vended products may be done quickly and efficiently, substantially reducing the time to restock the vending machine and/or improving the profitability of owning or operating a vending machine. For example, an operator may quickly replace or restock components with full or functional components.

According to some embodiments, modular components may also have the ability to be shipped to desired locations, allowing the machines to be restocked, tuned up or fixed without deploying the vending machine operator's labor force. In one example, cartridges and/or any other modular component of a vending machine may be drop-shipped (e.g., by a vending operator) to a "partner location", such as to a customer of a vending operator (e.g., to a company or location hosting one or more installed vending machines). The cartridge (e.g., containing products to be vended and/or one or more modular components) may simply be installed by a user at the partner location, such as an employee of a company at which a vending machine is installed. In this, the vending operator may avoid the labor requirements necessary to restock and/or repair vending machines using its own employees (e.g., which may result in savings to the client of the vending operator).

In some embodiments, a method utilizing cartridge-based vending may comprise a user receiving (e.g., at a partner location) a cartridge and/or other modular components of a modular vending machine, removing the component from the shipping container, logging into or otherwise obtaining physical access to the vending machine (e.g., using an electronic key providing by the vending operator), removing a cartridge (e.g., an empty product dispensing module) or other modular component from the vending machine, replacing the component with the received cartridge or component, and returning the removed cartridge or component back to the vending operator (e.g., by placing the component in the same shipping container to be drop-shipped).

Some embodiments of the present invention may also provide for improved tracking of the reliability and/or durability of one or more modular vending machine components. In one example, a motor (e.g., for dispensing vended items) may be replaced in a restocking or maintenance process (e.g., by replacing a cartridge including the motor). The motor may then be examined and, after confirming the motor is suitable and/or repairing the motor, put back into circulation in the vending machine system. Accordingly, this process may optimize the performance of vending machines with limited interruptions in service. In another example, over time the ability to monitor the performance of various types of components and store information about monitored components may allow for further analysis (e.g., to provide an understanding of the longevity of parts, anticipate or predict failure, and/or proactively replace parts prior to actual failure) based on the component monitoring information.

B. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments described in this disclosure are associated with a "control system". As used in this disclosure, the term "control system" may generally refer to any combination of hardware, software, firmware, and/or microcode that is operative to carry out and/or facilitate embodiments described in this disclosure. For example, a control system may comprise a processor performing instructions of a program to facilitate management of a modular vending machine system. The control system may comprise, according to some embodiments, a single device and/or component, or may comprise any practicable number of networked devices.

Some embodiments described in this disclosure are associated with a "network device". As used in this disclosure, the term "network device" may generally refer to any device that can communicate via a network. Examples of network devices include a PC, a workstation, a server, a printer, a scanner, a facsimile machine, a copier, a PDA, a storage device (e.g., a disk drive), a hub, a router, a switch, and a modem or a wireless phone. In some embodiments, network devices may comprise one or more network components, such as a Static Random Access Memory (SRAM) device or module, a network processor, and/or a network communication path, connection, port, or cable. Some examples of network devices may include, but are not limited to, servers or controllers, customer devices, vending machines, input devices, output devices, and peripheral devices.

As used in this disclosure, the terms "server" and "controller" may be used interchangeably and may generally refer to any device that may communicate with one or more vending machines, one or more product dispensing modules, one or more cartridge docking stations, one or more third-party servers, one or more remote controllers, one or more customer devices, one or more peripheral devices and/or other network nodes, and may be capable of relaying communications to and/or from each such device. A controller or server may, for example, comprise one or more network devices and/or components.

Some embodiments described in this disclosure are associated with an "input device". As used in this disclosure, the term "input device" may generally refer to any device that is used to receive or process input. An input device may communicate with and/or be part of another device. Some examples of input devices include, but are not limited to: a button, a key, one or more softkeys and/or variable function input devices, a bar code scanner, a magnetic stripe reader, a computer keyboard, a pointing device (e.g., a computer mouse, touchpad, and/or trackball), a keypad, a touch-screen, a microphone, an infrared sensor, a sonic ranger, a computer port, a video camera, a motion detector, an accelerometer, a thermometer, a digital camera, a network card, a Universal Serial Bus (USB) port, a Global Positioning System (GPS) receiver, a Radio Frequency Identification (RFID) receiver, and/or an RF receiver.

Some embodiments described in this disclosure are associated with an "output device". As used in this disclosure, the term "output device" may generally refer to a device that is used to output information. An output device may communicate with and/or be part of another device. Some examples of output devices may include, but are not limited to: a Cathode Ray Tube (CRT) monitor, a Liquid Crystal Display (LCD) screen, a Light Emitting Diode (LED) screen, a printer, an audio speaker (or other sound or noise-producing device), an Infra-red Radiation (IR) transmitter, an RF transmitter, a vibration device, and/or a data port.

It should be understood that some devices may function and/or operate as both input and output devices. A touch-sensitive display device (or "touch screen"), for example, may receive input by receiving pressure and/or electrostatic indications via a display screen, and may also provide output such as graphics, text, and/or other data via the same display screen.

Some embodiments in this disclosure are associated with "communication". As used in this disclosure, the term "communication" may refer to any information, data, and/or signal that is provided, transmitted, received, and/or otherwise processed by an entity, and/or that is shared or exchanged between two or more people, devices, and/or other entities. Communications may be external to one or more devices, internal (e.g., within a device and/or component), wired, wireless, continuous, and/or intermittent. Communications may involve, for example, one or more of transmitting, receiving, relaying, processing, and/or otherwise interfacing with information and/or data. Some, but not all, possible communication networks that may be utilized for such communications include: a Local Area Network (LAN), a Wide Area Network (WAN), the Internet, a telephone line (e.g., a Public Switched Telephone Network (PSTN)), a cable line, a radio channel, an optical communications line, and/or a satellite communications link. A variety of communications protocols may be utilized to facilitate and/or conduct such communications, including but not limited to: Ethernet (or IEEE 802.3), Internetwork Packet Exchange IPX), Service Advertising Protocol (SAP), Asynchronous Transfer Protocol (ATP), Bluetooth®, and/or Transmission Control Protocol (TCP)/Internet Protocol (IP). Communications may be encrypted to ensure privacy and prevent fraud in any of a variety of ways that are or become known or practicable.

Devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

As used in this disclosure, the terms "information" and "data" may be used interchangeably and may refer to any data, text, voice, video, image, message, bit, packet, pulse, tone, waveform, and/or other type or configuration of signal and/or information. Information may be or include information packets transmitted, for example, in accordance with the IP Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known or practicable.

In addition, some embodiments described in this disclosure are associated with an "indication". As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As used in this disclosure, the term "coupled" may generally refer to any type or configuration of coupling that is or becomes known or practicable. Coupling may be descriptive, for example, of two or more objects, devices, and/or components that are communicatively coupled, mechanically coupled, electrically coupled, and/or magnetically coupled. The term "communicatively coupled" generally refers to any type or configuration of coupling that places two or more objects, devices, components, or portions, elements, or combinations thereof in communication. Mechanical, electrical, and magnetic communications are examples of such communications. The term "mechanically coupled" generally refers to any physical binding, adherence, attachment, and/or other form of physical contact between two or more objects, devices, components, or portions, elements, or combinations thereof. The term "electrically coupled" indicates that one or more objects, devices, components, or portions, elements, or combinations thereof, are in electrical contact such that an electrical signal, pulse, or current is capable of passing between the one or more objects, enabling the objects to electrically communicate with one another. The term "magnetically coupled" indicates that one or more objects, devices, components, or portions, elements, or combinations thereof, are within one or more associated magnetic fields. Objects may be electrically and/or magnetically coupled without themselves being physically attached or mechanically coupled. For example, objects may communicate electrically through various wireless forms of communication or may be within (at least partially) a magnetic field, without being physically touching or even adjacent.

C. General Systems and Structures

Some embodiments of the present invention provide for a vending machine. In one or more embodiments, a vending machine may comprise one or more of: a product display area for displaying products (e.g., one or more types of products available for purchase via the vending machine), a product delivery area (e.g., for providing a customer access to a purchased product), a product dispensing module, a payment processing device (e.g., for facilitating and/or receiving payment by a customer for a product), a cabinet or other type of housing, and/or one or more product selectors (e.g., push buttons, an electronic user interface) by which a customer may select a product for purchase. In one example, a customer inserts, swipes, or otherwise interfaces a payment device (e.g., a credit card with a magnetic strip and/or secure chip, a device enabled with near field communication (NFC) technology and corresponding to a financial account) with the payment processing device (e.g., a credit card reader device) and selects a product using a product selector. The selected product is dispensed from a secured location (e.g., from within a modular product dispensing module where it is not accessible to the customer) into the product delivery area (e.g., accessible via a hinged door in the vending machine cabinet) and may be retrieved by the customer.

According to some embodiments, a payment processing device may comprise, for example, a bill and/or coin payment mechanism, a user interface for providing information for electronic payment, and/or a payment device sensor or other type of electronic device for reading, transmitting to and/or receiving payment information (e.g., an account number that identifies a financial account) from a payment device (e.g., a credit card).

According to some embodiments, the product display area may comprise one or more of a window to display actual product samples, and/or an electronic display device (e.g., a flat monitor), for example. If the product display area comprises a display device, the product display area may be used to display information about products available for purchase, information about new products, commercial messages and other advertisements (e.g., messages associated with a current location of the vending machine), information associated with a current location of the vending machine (e.g., a map, local information, local shopping information, local transportation information, local entertainment information), recommended products (e.g., based on information about a customers transaction history and/or current inventory), and the like. If the vending machine is installed in a vehicle or is otherwise mobile, the information associated with the current location may change as vending machine's location changes, as described with respect to various embodiments in this disclosure.

According to some embodiments, the product display area may comprise a touch-screen display. In one example, the display area displays product images and a customer may select a product for purchase by touching one of the displayed product images. Accordingly, in some embodiments touch-screen display may comprise the product selectors of the vending machine. In some embodiments, the product images to be displayed may be determined by a processor of the vending machine and/or by a central controller device in communication with the vending machine. In one example, each product for purchase may be associated (e.g., in a database) with a respective product image for display via the display area if that product is available for sale in the particular vending machine.

Referring first to FIG. 1, a block diagram of a system 100 according to some embodiments is shown. The various systems described in this disclosure are depicted for use in explanation, but not limitation, of described embodiments. Different types, layouts, quantities, and configurations of systems described in this disclosure may be utilized without deviating from the scope of some embodiments.

The example system 100 which includes a controller 150 that is in communication, via a communications network 190, with one or more vending machines 110*a*, 110*b*, 110*n*. The controller 150 may communicate with the vending machines (directly or indirectly) via a wired or wireless medium, such as the Internet, LAN, WAN or Ethernet, Token Ring, or via any appropriate communications means or combination of communications means.

Each of the vending machines may comprise one or more computers, such as those based on the Intel® Pentium® or Centrino™ processor, that are adapted to communicate with the controller 150. Further, in some embodiments, a controller 150 may comprise one or more computers, such as those based on the Intel® Pentium® processor, which may or may not be located remotely to one another or remotely to one or more of the vending machines. Thus, in some embodiments, a controller 150 may facilitate the transmission of data between one or more vending machines so that human operators may remotely interact with vending machines and/or vending machine customers. Further still, in some embodiments, system 100 includes one or more user devices (not shown) that enable customers to transmit data to and/or receive data from a vending machine and/or controller.

While three vending machines 110*a*, 110*b*, 110*n* are depicted in the system 100, fewer or more vending machines may be included in a vending machine system without deviating from the scope of one or more embodiments. Similarly, while the vending machines 110*a-n* are depicted as being in communication with and/or coupled to a controller 150 and/or a docking station 180, fewer or more such devices 150, 180 may be in communication with and/or coupled to any or all of the vending machines 110*a-n*.

According to some embodiments, the vending machines 110*a-n* may be in communication with and/or coupled to various devices (e.g., devices 150, 170, 180) via the Internet and/or network 190. The vending machines 110*a-n* may, for example, may be in communication with the controller 150 for transmitting and/or receiving various types of information, such as without limitation, information about cartridges, sales information, product information, and/or location information.

The system 100 may comprise, for example, one or more vending machines 110*a*, 110*b*, 110*n* in communication with a controller 150 via a network 190. The network 190 may generally comprise any practicable and/or desirable type and/or configuration of network, such as the Internet and/or a LAN. Any number and type of vending machines 110*a-n* may be in communication with the controller 150. Communication between the vending machines and the controller 150, and among the vending machines, may be direct or indirect, such as over the Internet through a Web site maintained by controller 150 on a remote server and/or over an on-line data network including commercial on-line service providers. In yet other embodiments, the vending machines may communicate with one another and/or controller 150 over RF, cable TV, satellite links and the like.

In an embodiment, communication networks that may be included in communications network 190, or that may be otherwise included as part of system 100, include: a local area network (LAN), a wide area network (WAN), the Internet, a telephone line, a cable line, a radio channel, an optical communications line, a satellite communications link. Possible communications protocols that may be part of 100 200 include: Ethernet (or IEEE 802.3), SAP, ATP, Bluetooth™, and TCP/IP. Communication may be encrypted to ensure privacy and prevent fraud in any of a variety of ways well known in the art.

In an embodiment, the controller 150 need not be employed. For example, according to an embodiment, a stand-alone vending machine and/or a vending machine in communication with one or more other vending machines may be employed without the controller 150. Accordingly, any functions described as performed by the controller 150 and any data described as stored on the controller 150 may, alternatively or in addition, be performed by or stored on one or more vending machines in accordance with various embodiments.

Similarly, in an embodiment consistent with FIG. 2, some of the functionality described with reference to FIG. 1 as being performed by vending machines 110*a-n* may instead or in addition be performed by system 200. Similarly, any data described with reference to FIG. 1 as being stored in a memory of vending machines 110*a-n* may be instead or in addition stored in a memory of system 200.

One or more of the vending machines 110*a*, 110*b*, 110*n* may comprise, for example, a casing enclosing one or more of a processor, a communications device, an inventory storage and dispensing device, a payment processing device, an input device, an output device, and/or a data storage device. According to some embodiments, one or more of vending machines 110*a*, 110*b*, 110*n* may be configured to perform and/or facilitate processes in accordance with one or more embodiments described in this disclosure.

Example vending machine 110*b* may comprise, for example, one or more product cartridges 140*a*, 140*b*, 140*n*. Although three such product cartridges are depicted, any number of product cartridges may be utilized as deemed appropriate for a desired implementation. According to one embodiment, one or more of the product cartridges is in communication with and/or coupled a processor of vending machine 110*b* (e.g., for transmitting information to the vending machine such as, without limitation, a cartridge ID that identifies the cartridge).

Example docking station 180, in accordance with some embodiments, may comprise an apparatus configured to receive one or more cartridges (e.g., cartridge 170) for stocking products in the cartridge and/or receiving a cartridge ID that identifies the cartridge (e.g., for storing in a cartridge database accessible by one or more of controller 150 and/or a vending machine). In one embodiment, the docking station 180 may transmit a cartridge ID to the cartridge 170 (e.g., for storing the ID in a memory of the cartridge). Any number of docking stations may be used in example system 100 as deemed appropriate for a particular implementation.

Those skilled in the art will understand that vending machines and/or computers in communication with each other need not be continually transmitting to each other. On the contrary, such vending machines and/or computers need only transmit to each other as necessary or desirable, and may actually refrain from exchanging data most of the time. For example, a vending machine in communication with another machine via the Internet may not transmit data to the other machine for weeks at a time.

Figure 2:
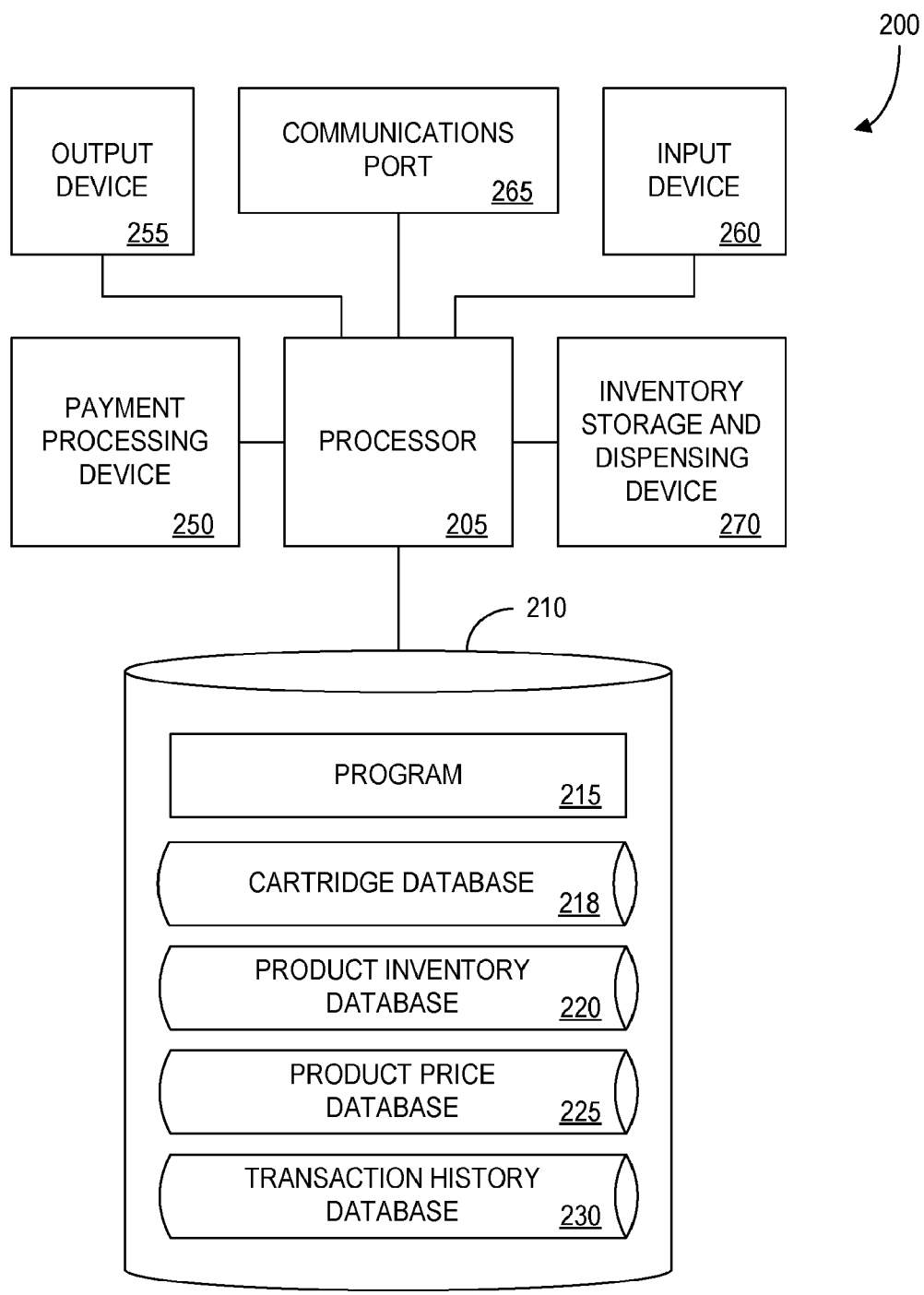
FIG. 2 is a diagram of a vending machine according to an embodiment of the present invention.

Referring to FIG. 2, a block diagram of a system 200 according to some embodiments is shown. In one or more embodiments, the system 200 may comprise multiple devices (e.g., a controller and one or more vending machines and/or docking stations). In some embodiments, system 200 may be embodied as a single device (e.g., a vending machine). The vending machine 200 may comprise, for example, one or more of a processor 205, an inventory storage and dispensing device 270, a payment processing device 250, an input device 260, an output device 255, a communications port 265, and/or a data storage device 210. According to some embodiments, the vending machine 200 may be configured to perform and/or facilitate processes in accordance with embodiments described in this disclosure.

In some embodiments, a casing may enclose one or more of the components of the vending machine 200. According to some embodiments, a suitable casing and/or cabinetry may be constructed from any suitable material, including but not limited to any combination of (1) commercial grade steel (e.g., for exterior panels and/or internal shelving), (2) transparent materials such as glass or Plexiglas™ (e.g., for product display windows), (3) rubber (e.g., for waterproofing insulation), (4) plastic, and/or (5) aluminum.

According to some embodiments, the vending machine 200 may include the processor 205 that may be or include any type, quantity, and/or configuration of processor that is or becomes known. The processor 205 may comprise, for example, an Intel® IXP 2800 network processor or an Intel® XEON™ Processor coupled with an Intel® E7501 chipset. In some embodiments, the processor 205 may comprise multiple inter-connected processors, microprocessors, and/or micro-engines. According to some embodiments, the processor 205 may include or be coupled to one or more clocks or timers (not explicitly shown) and to the communications port 265. The processor 205 may communicate, in accordance with some embodiments, through the communications port 265 with other devices such as one or more peripheral devices, one or more servers, and/or one or more user devices (e.g., such as a laptop computer, tablet computer, or smartphone). The communications port 265 may, for example, comprise any type or configuration of communication port, cable, modem, and/or signal transceiver that is or becomes known or practicable.

In some embodiments, the processor 205 may also or alternatively be in communication with and/or coupled to any number of other components of the vending machine 200 such as the inventory storage and dispensing device 270, the payment processing device 250, the input device 260, the output device 255, and/or the data storage device 210.

In some embodiments, the vending machine 200 may comprise the inventory storage and dispensing device 216. The inventory storage and dispensing device 216 may, according to some embodiments, comprise any number and/or configuration of devices and/or components that facilitate and/or are associated with the storage and/or dispensing of products or services available via the vending machine 200.

Product inventory storage and product dispensing functions of the vending machine 200 configured in accordance with one or more vending machine embodiments may include, for example, one or more of: (i) a drive motor, (ii) metal shelves, (iii) a product delivery system and/or area (e.g., a chute, product tray, and/or product tray door), and/or (iv) an arrangement of product supporting positions (e.g., single and/or dual spiral/helical rods or coils for holding and/or dispensing items).

According to some embodiments, the vending machine 200 may comprise the payment processing device 250. The payment processing device 250 may, according to some embodiments, comprise any number and/or configuration of devices and/or components for receiving payment and/or dispensing change, including a coin acceptor, a bill validator, a card reader (e.g., a magnetic stripe reader and/or embedded chip reader), an NFC-based payment device reader, and/or a change dispenser.

In some embodiments, a magnetic stripe card reader may read data on a magnetic stripe of a credit or debit card, for example, and it may cooperate with conventional POS credit card processing equipment to validate card-based purchases through a conventional transaction authorization network. Suitable card-based transaction processing systems and methods are available from USA Technologies, Inc.™ of Wayne, Pa. In some embodiments, a coin acceptor, bill validator and/or change dispenser may communicate with and/or be coupled to a currency storage apparatus (a "hopper"; not shown) and may comprise conventional devices such as models AE-2400, MC5000, TRC200 by Mars, Inc.™ of West Chester, Pa., or CoinCo™ model 9300-L.

Coin acceptors and/or bill validators may receive and validate currency that is stored by the currency storage apparatus. According to some embodiments, a change dispenser may activate the return of coinage to the customer when change is due. Such apparatus may feature Multidrop Bus (MDB) and/or Micromech peripheral capabilities, as are known in the art.

In another embodiment, the vending machine 200 may be configured to receive payment authorization and/or product selection commands or signals through a wireless device communication network (e.g., via the communications port 265), directly or indirectly, from a customer device (e.g., a cellular telephone or tablet computer). In such an embodiment, the payment processing device 250 may comprise a cellular transceiver operatively connected to the processor 205 to receive, transmit, and/or process such signals. Systems and methods allowing for the selection of and payment for vending machine products via cellular telephones are provided by USA Technologies, Inc.™. Further, in such an embodiment, a customer cellular telephone may serve as an input device 260 and/or an output device 255, as described elsewhere in this disclosure. Further details concerning vending machine payment processing devices 250 are well known in the art, and need not be described in further detail in this disclosure.

According to some embodiments, the vending machine 200 may comprise one or more input device 260 and/or one or more output devices 255. In some embodiments, the input device(s) 220 may be operable to receive input from (i) a customer indicating a product and/or offer selection, from (ii) an operator (or agent thereof) during stocking or maintenance of the vending machine 200, and/or from (iii) a third party. Also, the output device 255 may be configured for outputting product and/or offer information (such as promotions) to a customer, operator, and/or third party. The input devices and/or output devices may communicate with a vending machine processor 205 through any practicable interface, such as a USB interface.

Many combinations of input devices 260 and output devices 255 may be employed according to various embodiments. In some embodiments, the vending machine 200 may include more than one input device 260. For example, the vending machine 200 may include an exterior input device for receiving customer input and an interior input device for receiving input form an operator or other user authorized to access the interior of the vending machine (e.g., for restocking and/or maintenance). In some embodiments, the input device 260 may provide the dual functionality of receiving input data from more than one type of user (e.g., operators, customers, and authorized users at a partner location). Likewise, a vending machine 200 may comprise more than one output device 255 (e.g., a primary display, a secondary display, and/or an LCD screen and several LED devices). In some embodiments, such as those which feature touch screens (described elsewhere in this disclosure), the functionality of both input devices 260 and output devices 255 may be provided by a single device and/or type of device.

Many input devices 260 are contemplated. Thus, an input device 260 may comprise, for example, one or more of the following: (i) a set of alpha-numeric keys for providing input to the vending machine, (ii) a selector dial, (iii) a set of buttons associated with a respective set of item dispensers, (iv) a barcode reader (e.g., a 1-D or 2-D barcode reader), (v) a Dual-Tone Multi-Frequency receiver/decoder, (vi) a wireless device (e.g., a cellular receiver; a radio-frequency receiver; an infrared receiver; a wireless access point or wireless router; other wireless devices), (vii) a smart card reader, (viii) a magnetic stripe reader, (ix) a biometric identification apparatus (e.g., an iris scanner, a retinal scanner, a thumbprint reader, etc.), (x) a customer device, and/or (xi) any other type or configuration of input device 260 that may be or become known or practicable.

Likewise, many types of output devices 255 are contemplated. For example, an output device 255 may comprise an LCD screen or device. Alternatively or additionally, the output device 255 may comprise one or more LED displays or devices. According to some embodiments, the output device 255 may also or alternatively comprise an audio module, such as an audio speaker, that outputs information to customers audibly.

As stated, in some embodiments, a touch-sensitive screen may be employed to perform both input device 260 and output device 255 functions. Suitable, commercially available touch screens for use according to various embodiments are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, and/or (iii) a third screen layer comprising a glass substrate with a uniform-conductive coating. Further, such touch screens may be configured to detect input within a determined positional accuracy, such as a standard deviation of error less than plus or minus eight hundredths of an inch (±0.08"/2 mm). These and other operational details of touch screens (e.g., drive current, signal current, capacitance, open circuit resistance, and closed circuit resistance) are well known in the art and need not be described further in this disclosure.

In some embodiments, input and/or output functionality of the vending machine 200 may be facilitated through a wireless device configured to send data to, and/or receive data from a user device, such as a laptop computer or a cellular telephone. In some embodiments, such a wireless device may comprise a sensor that detects signals from a customer device. Such signals may include but are not limited to radio frequency signals and/or IR signals. Thus, in one or more embodiments, a wireless input device 260 may comprise a WAP or router configured to operate in accordance with an IEEE 802.11 standard, including the 802.11b and 802.11g standards, which transmit at 2.4 GHz, or the 802.11a standard, which transmits at 5 GHz. Such a wireless device may, in some embodiments, have the capability to "frequency hop" between radio frequencies so as to reduce interference and/or increase security. Encryption techniques may also or alternatively be employed to increase the security of transmissions. Suitable WAPs are available from Belkin™ Corporation of Compton, Calif. and Cisco™ Systems, Inc. of San Jose, Calif. A wireless device may, in some embodiments, be used to establish a communication link as described in this disclosure.

Additionally, in some embodiments, an output device 255 may comprise an audio module, such as an audio speaker, that outputs information to customers audibly. Speakers may comprise conventional speakers and/or modern hypersonic speakers.

The data storage device 210 may, in accordance with some embodiments, include any appropriate combination of magnetic, optical and/or semiconductor memory, and may include, for example, additional processors, communication ports, RAM, Read-Only Memory (ROM), a compact disc and/or a hard disk. The processor 205 and the data storage device 210 may each be, for example: (i) located entirely within a single computer or other computing device; or (ii) connected to each other by a remote communication medium, such as a serial port cable, a Local Area Network (LAN), a telephone line, RF transceiver, a fiber optic connection and/or the like. In some embodiments for example, vending machine 200 may comprise one or more computers (or processors 205) that are connected to a remote server computer (e.g., via the communications port 265) operative to maintain databases, where the data storage device 210 is comprised of the combination of the remote server computer and the associated databases.

The data storage device 210 may generally store one or more programs 215 for controlling the processor 205. The processor 205 may perform instructions of the program 215, for example, and thereby operate in accordance with some embodiments, and particularly in accordance with the methods described in detail in this disclosure. According to some embodiments, the program 215 may comprise any number or type of programs that are or becomes known or practicable. In some embodiments, the program 215 may be developed using an object oriented programming language that allows the modeling of complex systems with modular objects to create abstractions that are representative of real world, physical objects and their interrelationships. However, it would be understood by one of ordinary skill in the art that the embodiments described in this disclosure can be implemented in many different ways using a wide range of programming techniques as well as general purpose hardware systems or dedicated controllers.

The program 215 may be stored in a compressed, un-compiled and/or encrypted format. The program 215 furthermore may include program elements that may be generally useful, such as an operating system, a database management system and/or device drivers for allowing the processor 205 to interface with computer peripheral devices and/or the various components of the vending machine 200. Appropriate general purpose program elements are known to those skilled in the art, and need not be described in detail in this disclosure.

Further, the program 215 may be operative to execute a number of invention-specific objects, modules and/or subroutines which may include (but are not limited to) one or more subroutines to determine cartridge inventory (e.g., the identity and/or number of product cartridges currently installed in a modular vending machine), product inventory (e.g., what types of products and/or number of items), product price information, location information (e.g., current location) and/or transaction history information. The program 215 may also or alternatively comprise one or more procedures for causing the processor 205 to determine one or more advertising messages to present to a customer based on a location of the vending machine 200 (e.g., based on the current location of a vehicle-based vending machine, as determined by a GPS receiver). Examples of some of these subroutines and their operation are described in detail with respect to the processes described elsewhere in this disclosure.

According to some embodiments, the instructions of the program 215 may be read into a main memory (not explicitly shown) of the processor 205 from another computer-readable medium (such as the data storage device 210), like from a ROM to a RAM. Execution of sequences of the instructions in the program 215 may cause the processor 205 to perform the process steps described in this disclosure. In alternative embodiments, hard-wired circuitry or integrated circuits may be used in place of, or in combination with, software instructions for implementation of the processes described in this disclosure. Thus, some embodiments are not limited to any specific combination of hardware, firmware, and/or software.

In addition to the program 215, the data storage device 210 may also be operative to store one or more databases, files, and/or tables, containing information such as (i) cartridge database 218, (ii) product inventory database 220, (iii) product price database 225, and/or (ii) transaction history database 230. Any number of data arrangements may be employed besides those suggested in FIG. 2. For example, even though four separate data tables, stores, files, and/or databases are illustrated, embodiments may be practiced effectively using fewer or more functionally equivalent databases or similar structures. Codes and/or identifiers, rules or parameters, transaction history data, third party data, and/or other metrics may, for example, be stored to facilitate the embodiments described in this disclosure being practiced via the vending machine 200. It will be readily understood that an object-based model may be used to store and manipulate one or more various data types, and likewise, object methods or behaviors may be used to implement one or more of the processes described in this disclosure.

It should be noted that, in some embodiments, some or all of the functions and method steps described in this disclosure may be performed partially or entirely by one or more separate devices (not explicitly shown). Separate devices for use with such an embodiment include, but are not limited to, user devices (e.g., of partner users, operators, and/or customers) and customer devices (PDA devices, laptop computers, and cellular telephones). In some embodiments featuring separate devices, such devices may be capable of communicating, directly (e.g., via Bluetooth® connectivity) or indirectly (e.g., through a web server or IVRU), to a control system (e.g., controller 150 of FIG. 1) in order to facilitate inventive functionality described in this disclosure. In some embodiments featuring separate devices, such separate devices may be capable of communicating with a remote computer.

Figure 3:
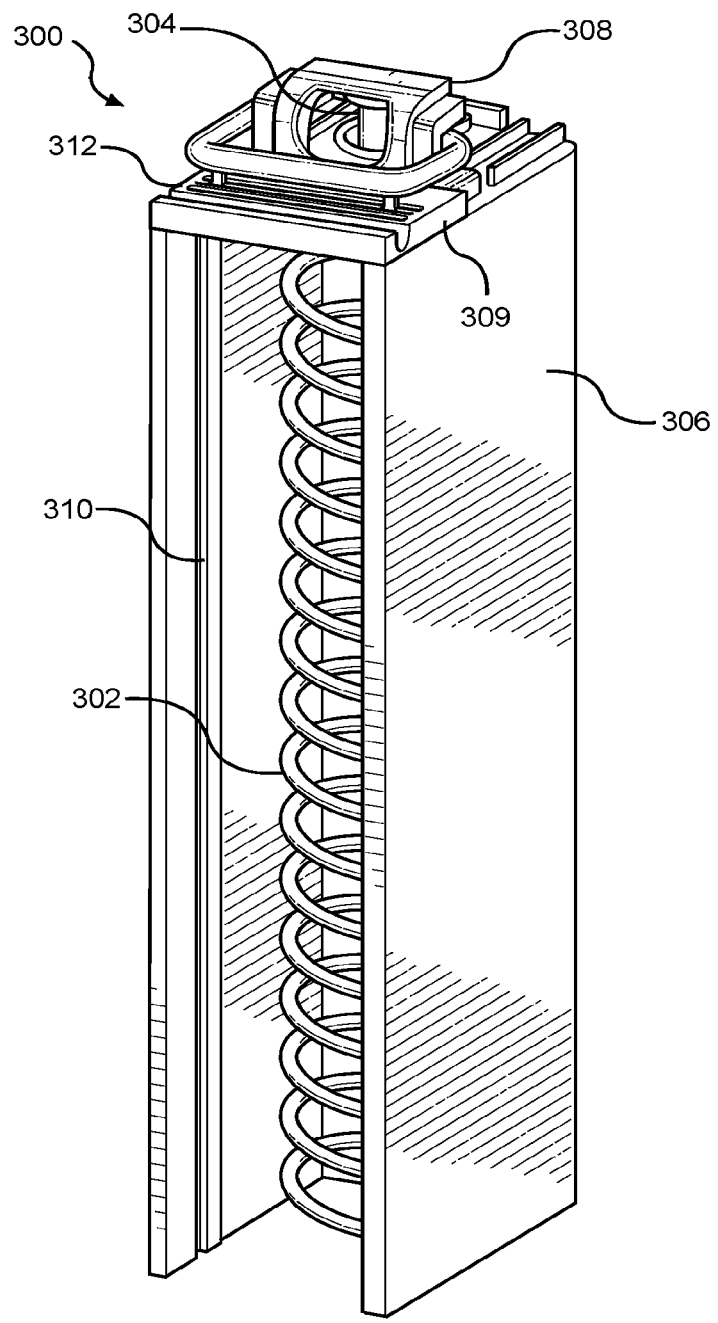
FIG. 3 is a perspective view of a product dispensing module according to an embodiment of the present invention.

FIG. 3 shows a perspective diagram of an example product dispensing module 300 in accordance with one or more embodiments. The product dispensing module 300 may comprise, for example, a vertical conveyor 302 connected to a coupler 304, which is connected to container 306. In one example, the vertical conveyor 302 may comprise at least one spiral or helical coil and/or screw-type conveyor rotatably mounted in the container 306, the longitudinal axis of which may be aligned or oriented to provide a plurality of product supporting positions in a substantially vertical arrangement. For example, each product to be vended may be placed on top of a respective loop of a helical coil so that the items are supported in a substantially vertical column within the product dispensing module. In some embodiments, the product dispensing module 300 may comprise a plurality of products, with each product stored in a respective one of the plurality of product supporting positions of the vertical conveyor.

In another embodiment the vertical conveyor 302 may comprise one or more conveyor belt loops. For example, a conveyor belt loop may comprise one or more attached shelves to support products moving substantially vertically in the module. In one embodiment one end of the shelves may be attached to the conveyor belt loop with hinges such that the shelves fold down to a position substantially in the same plane as the loop as the loop returns to the top of the product dispensing module, and then, when the loop returns and moves downward, the shelves fall into a substantially horizontal supporting position relative to the longitudinal axis of the module and/or substantially perpendicular to the loop's travel path.

The example product dispensing module 300 may also comprise at least one coupler 304 configured for coupling with a drive assembly (e.g., a motor for coupling with and operating the vertical conveyor 302). In one embodiment the coupler may be connected and/or be integrated with the vertical conveyor 302. In one example, the coupler 304 may be part of and/or may be connected to the vertical conveyor 302 through a side of the product dispensing module (e.g., through module coupler mechanism 309 of FIG. 3). According to some embodiments, the coupler 304 may be configured to couple with a drive assembly and/or motor of a vending machine (e.g., a modular vending machine configured to receive replaceable product dispensing modules) and/or of a product dispensing module. For example, in response to a signal and/or instruction transmitted by a controller device of the vending machine and/or a product dispensing module, a drive assembly may operate a vertical conveyor to dispense a purchased product (e.g., by rotating a helical coil in order to release or dispense a product held at a product supporting position of the coil).

The container 306 may comprise at least one side (and/or other retaining component) configured to retain one or more products in the product dispensing module (e.g., in the product supporting positions of the vertical conveyor 302). In some embodiments, the container may be configured with a substantially rectangular or square lateral cross section, or the container may be configured with a lateral cross section of a substantially circular, triangular or elliptical shape, or may be of any shape deemed desirable for a particular implementation. In some embodiments, as depicted in FIG. 3, the container 306 may comprise two opposite side walls, a third side wall (e.g., a rear side wall), and a module coupler mechanism 309 that provides and/or is integrated with a top side wall, with the vertical conveyor 302 rotatably mounted through an opening in the module coupler mechanism 309 to the coupler 304. In one or more embodiments, the size of the product dispensing module 300 may be configured to allow for a modular vending machine with a relatively slimmer profile.

According to some embodiments, the product dispensing module 300 may comprise a coupler lock 308 connected to the container 306. In one embodiment, the coupler lock 308 may be configured (as discussed in more detail in this disclosure) to substantially prevent movement of the coupler 304 and/or the vertical conveyor 302. For example, the coupler lock 308 may be configured to substantially limit movement of the coupler 304 when the coupler is not coupled to a drive assembly for operating the vertical conveyor 302 (e.g., when the product dispensing module 300 is being filled with product or prepared for transportation). In another example, the coupler lock 308 may be configured to allow movement of the coupler 304 and/or the vertical conveyor 302 to dispense products when the coupler is coupled to a drive assembly for operating the vertical conveyor (e.g., when the product dispensing module 300 is installed in a modular vending machine). In some embodiments, the coupler 304 is rotatable (e.g., in order to rotate the attached vertical conveyor 302) and the coupler lock is accordingly configured to engage the coupler to prevent the coupler from rotating.

According to some embodiments, as depicted in FIG. 3, the coupler 304 and the coupler lock 308 may be connected to and/or integrated with a module coupler mechanism 309 (which may also function as a top cover or side wall of the container 306) of the product dispensing module 300. In one example, the module coupler mechanism 309 may be formed at least in part by a module coupler mechanism that comprises an opening through which the vertical conveyor 302 may be connected to the coupler 304.

According to some embodiments, at least one wall of the product dispensing module 300 comprises at least one pair of grooves or channels 310 configured to receive a removable panel. For example, the depth of the container 306 may be adjustable by use of a removable side or panel in order to accommodate products of various sizes in the product supporting positions. In some embodiments, the product dispensing module 300 may comprise one or more openings 312 in the container 306 and/or module coupler mechanism 309 for receiving a removable panel or side. In one example, as depicted in FIG. 3, the product dispensing module 300 may comprise a plurality of openings 312, each opening being associated with a respective selectable and/or configurable depth of the container 306 that may be selected by an operator or other type of user as appropriate for a particular size of product. In some embodiments, each opening 312 may be associated with a respective set of one or more grooves 310 for receiving and holding a panel inserted through the corresponding opening.

Although depicted in the example as having one or more open sides (e.g., the open front and bottom sides), it will be readily understood that any number of sides of the example container 306 may be partially or wholly covered by a respective wall portion as desired.

According to some embodiments, discussed in further detail in this disclosure, the coupler lock 308 may be movably attached to the container 306. In one example, the coupler lock 308 may be movable from a first coupler lock position (e.g., for engaging the coupler 304 to prevent its movement) to a second coupler lock position (e.g., for disengaging the coupler 304 to allow its movement). In one embodiment, the coupler lock 308 may be movably and/or slidably attached to or part of the module coupler mechanism 309 and may be slidable or may otherwise be movable from the first coupler lock position to the second lock position. In another embodiment, a coupler lock may be removable or detachable from the container (e.g., in order to disengage the coupler).

According to some embodiments, the coupler lock 308 may be configured so that installing the product dispensing module in a modular vending machine and/or coupling the coupler with a drive assembly for operating the vertical conveyor, moves the coupler from a locked position to an unlocked position. For example, in one embodiment, coupling the coupler with a drive assembly for operating the vertical conveyor causes the drive assembly and/or other portion of a vending machine to push or otherwise move the coupler from the first coupler lock position to the second coupler lock position.

According to some embodiments, the product dispensing module 300 may comprise a handle connected to the container that may be useful in handling the module and/or aligning the module for installation or removal. In one embodiment, the handle may be attached to and/or part of module coupler mechanism 309.

In some embodiments, the product dispensing module 300 may comprise a data storage device (not shown) storing an identifier that identifies the product dispensing module (e.g., a module identifier that uniquely identifies the product dispensing module). In one embodiment, the data storage device may be configured to be read by and/or otherwise communicate with a processing device of a vending unit for reading the identifier. In one embodiment, the data storage device may, when the product dispensing module is coupled to a drive assembly and/or installed in a modular vending machine, connect electronically with a processing device (e.g., an RFID reader) configured to read the data storage device when the coupler is coupled to a drive assembly.

Figure 4:
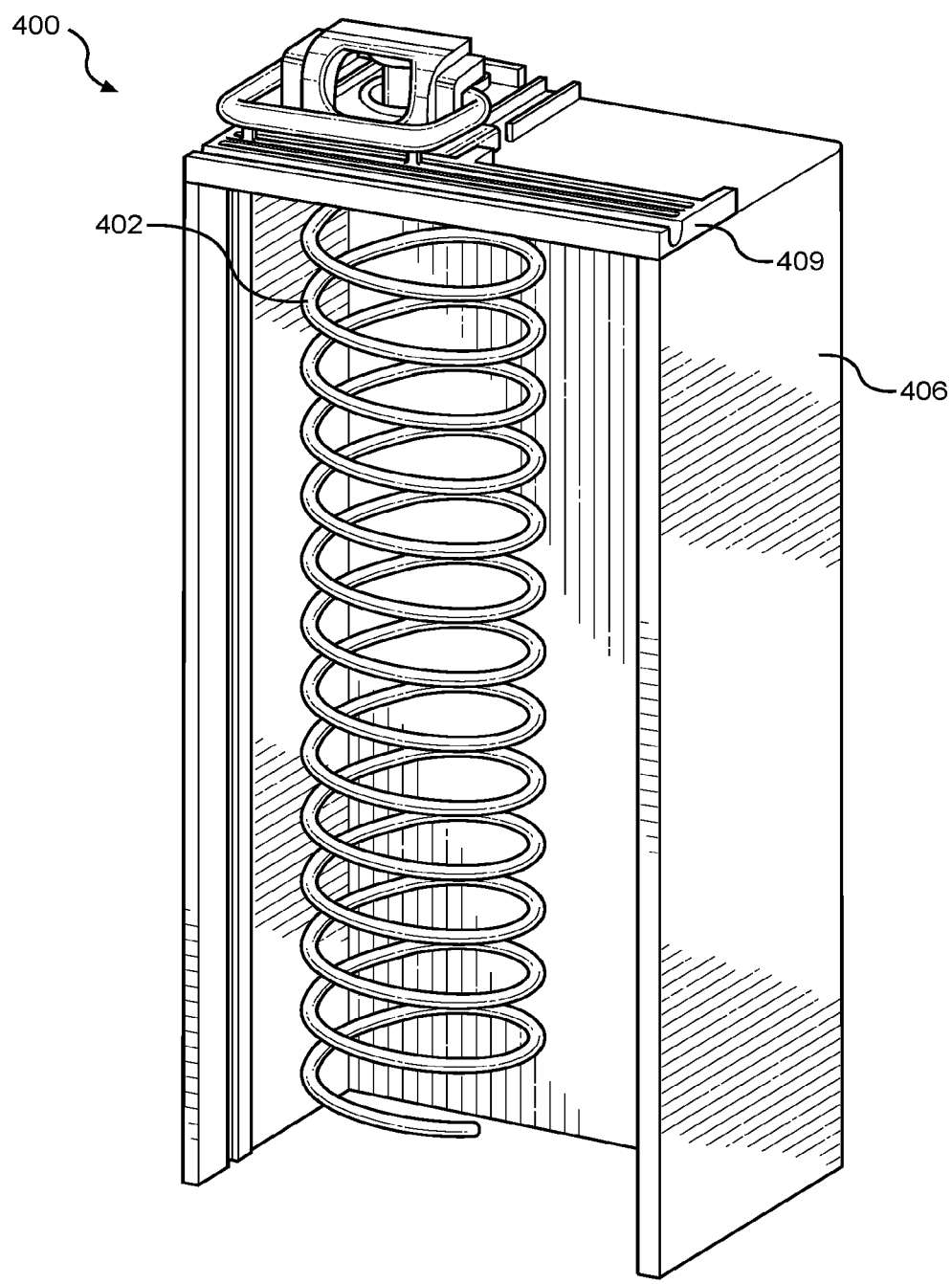
FIG. 4 is a perspective view of a product dispensing module according to an embodiment of the present invention.

FIG. 4 shows a perspective diagram of another example product dispensing module 400 in accordance with one or more embodiments. The product dispensing module 400 may comprise, for example, a vertical conveyor 402 connected to a module coupler mechanism 409 (e.g., a mechanism comprising a coupler, a coupler lock and/or one or more openings for receiving a removable front panel), which is connected to container 406. In contrast to the container 306 of FIG. 3, the container 406 is wider, relative to the width of the vertical conveyor 402. The configuration of the container 406 allows for storage of products that are larger (e.g., wider) than the width of the vertical conveyor 402. Although the vertical conveyor 402 is depicted as being to one side of the container 406, it will be readily understood that the vertical conveyor 402 may be centered or may be in any position relative to the sides of the container 406, as deemed desirable for a particular implementation. According to some embodiments, the product dispensing module 400 may comprise one or grooves and/or openings (not shown) for receiving a removable and/or adjustable panel for adjusting the width and/or height of the portion of the container 406 in which products may be stored. Accordingly, some embodiments of the present invention allow for reconfiguring the depth, height and/or depth of the area (e.g., around the vertical conveyor 402) in which products are stored for shipment and/or dispensing.

Figure 5:
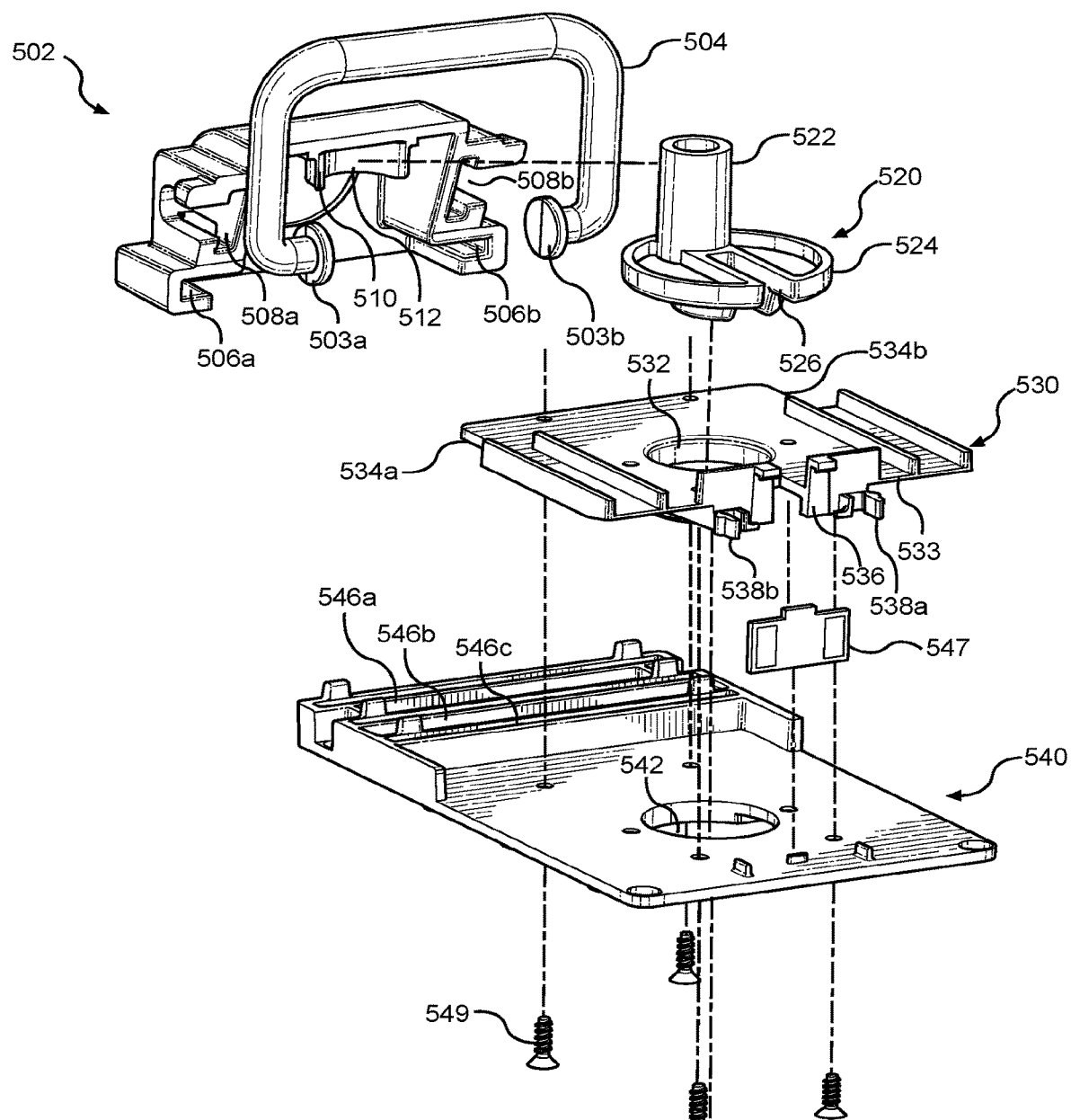
FIG. 5 is a perspective view of a module coupler mechanism according to an embodiment of the present invention.

FIG. 5 shows a perspective view of example components of an example module coupler mechanism in accordance with one or more embodiments. In accordance with one or more embodiments, coupler lock 502 may comprise a coupler receiver 510 that defines a slot or other receiving portion 512 configuring for receiving, securing and/or releasing a corresponding module coupler 520 and/or coupler stem 522, as discussed with respect to FIG. 6A and FIG. 6B. In some embodiments, the coupler lock 502 may further comprise one or more lock sliders 506a, 506b configured for movably connecting the coupler lock 502 to coupler base 530. For example, force applied (e.g., by a user installing a product dispensing module) to the coupler lock 502 may be used to move the lock sliders 506a, 506b into a position for locking or unlocking the module coupler 520, as desired.

According to some embodiments, a handle may be attached to one or more of the coupler lock 502, the coupler base 530, the module coupler 520 and/or module container side 540, and may be attached in any manner deemed appropriate for a desired implementation or use. In one embodiment, the coupler lock 502 of the example module coupler mechanism may further comprise a handle 504. As depicted in the non-limiting example of FIG. 5, in one embodiment the handle 504 may be attached to the coupler lock 502 by inserting handle ends 503a, 503b into handle slots 508a, 508b.

According to some embodiments, the module coupler 520 may comprise a module coupler base 524 which, in one or more embodiments, comprises an opening, slot or other receiver 526 for receiving and/or coupling with a corresponding coupler or other portion of a conveyor. In one example, as depicted in FIG. 5, conveyor coupler stem 562 of conveyor coupler 560 may be secured in the receiver 526 so that when the coupler stem 522 and/or the module coupler base 524 are rotated (e.g., by a drive assembly of a vending machine), the conveyor coupler stem 562 also rotates, thereby rotating any conveyor attached to the conveyor coupler 560. For example, a portion of a vertical coil may be configured to be inserted and secured in channel 566 of conveyor coupler base 564 so that when the module coupler 520 is rotated, the vertical coil also rotates (e.g., to dispense a product held in the coil).

In one or more embodiments, at least one of the module coupler 520 and the conveyor coupler 560 may comprise at least one opening or passageway for receiving and/or securing one or more of the module coupler 520 and/or conveyor coupler 560, and/or for allowing the module coupler 520 and conveyor coupler 560 to connect. As depicted in FIG. 5, openings 532, 542 allow for the module coupler 520 to engage with the conveyor coupler 560.

As shown in FIG. 5, in some embodiments the module coupler 520 and the conveyor coupler 560 may be connected to one another and/or secured to one or more other components of a module coupler mechanism, including but not limited to coupler platform 530 and container platform 540. Although depicted in FIG. 5 as separate components, it will be understood that coupler platform 530 and container platform 540 may be integrated as a single component; alternatively, various features of coupler platform 530 and/or container platform 540 may be provided for in any number of separate components as deemed practicable for assembling and/or desired use.

According to some embodiments, the coupler platform 530 may comprise one or more coupler platform slider portions 534a, 534b for engaging with lock sliders 506a, 506b, respectively. The lock sliders 506a, 506b may be configured to be movably connected to the coupler platform slider portions 534a, 534b, such as by having the lock sliders engage the coupler platform 530 at the coupler platform slider portions 534a, 534b. In one embodiment, once assembled the coupler lock 502 may be prevented (e.g., by means of a retaining structure on the coupler platform 530 and/or container platform 540) from disengaging completely from the coupler platform 530.

According to some embodiments, the coupler platform 530 and/or container platform 540 may comprise one or more components for storing one or more data storage or memory devices of a module coupler mechanism. In one example, as depicted in FIG. 5, memory device holder 536 may be configured to secure a memory device (e.g., example RFID chip 547). In some embodiments, the placement of the memory device holder 536 may be configured to facilitate the electrical connection of a memory device with a vending machine in which a product dispensing module is installed. As discussed in this disclosure, the memory device may include information for a product dispensing module, including, without limitation, an indication of an identifier that identifiers the product dispensing module (e.g., a unique module ID), information about products stored in a product dispensing module and/or price information related to products stored in a product dispensing module.

According to some embodiments, the coupler platform 530 and/or container platform 540 may comprise one or more components for mounting or otherwise installing a product dispensing module in a modular vending machine. In one example, as depicted in FIG. 5, mounting components 538a and 538b may be the protruding parts of snap joints (e.g., plastic cantilever snap joints) which, when the product dispensing module is installed in a vending machine, will catch in corresponding depressions in mating components of the vending machine. Preferably, such mounting components 538a and 538b secure the product dispensing module sufficiently when installed to facilitate one or more of: (i) reading of a module's memory device (e.g., by keeping the module's memory device in sufficient proximity to a memory device reader of a vending machine so that the memory device can be read successfully) and (ii) keeping the product dispensing module from moving, vibrating, or tilting in a way that might affect any dispensing or other operations of the module. Some other examples of mounting structures and module holding structures, which may include mounting components such as snap joints or the like, are discussed in more detail with respect to FIG. 10B and FIG. 11.

In some embodiments, one or more fasteners 549 (e.g., screws, nails, pins, and the like) may be used to secure or otherwise connect components of the module coupler mechanism together. Various types of fasteners and suitable for connecting, for example, coupler platform 530 and container platform 540 will be understood by those skilled in the art in light of the present disclosure.

As discussed above with respect to FIG. 3, in some embodiments a module coupler mechanism of a product dispensing module may comprise one or more openings 546a, 546b, 546c for receiving a removable panel or side of a container, allowing for the depth of the container to be adjusted as appropriate for products of different sizes.

Figure 6A:
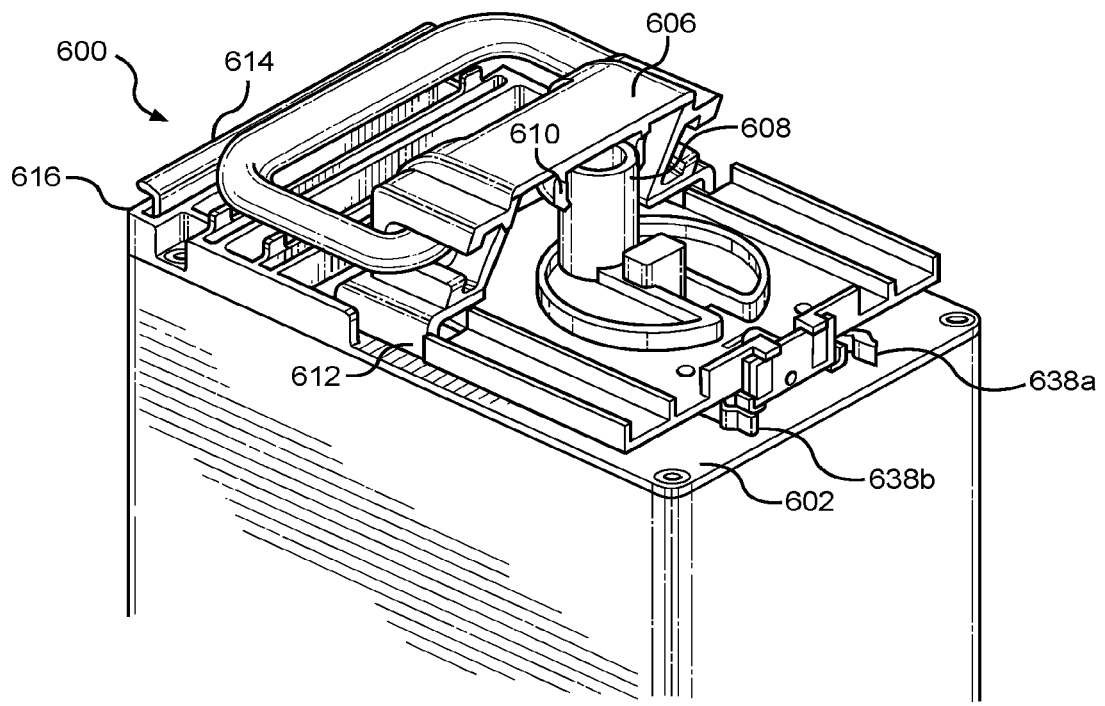
FIG. 6A and FIG. 6B are perspective views of a product dispensing module according to an embodiment of the present invention.
Figure 6B:
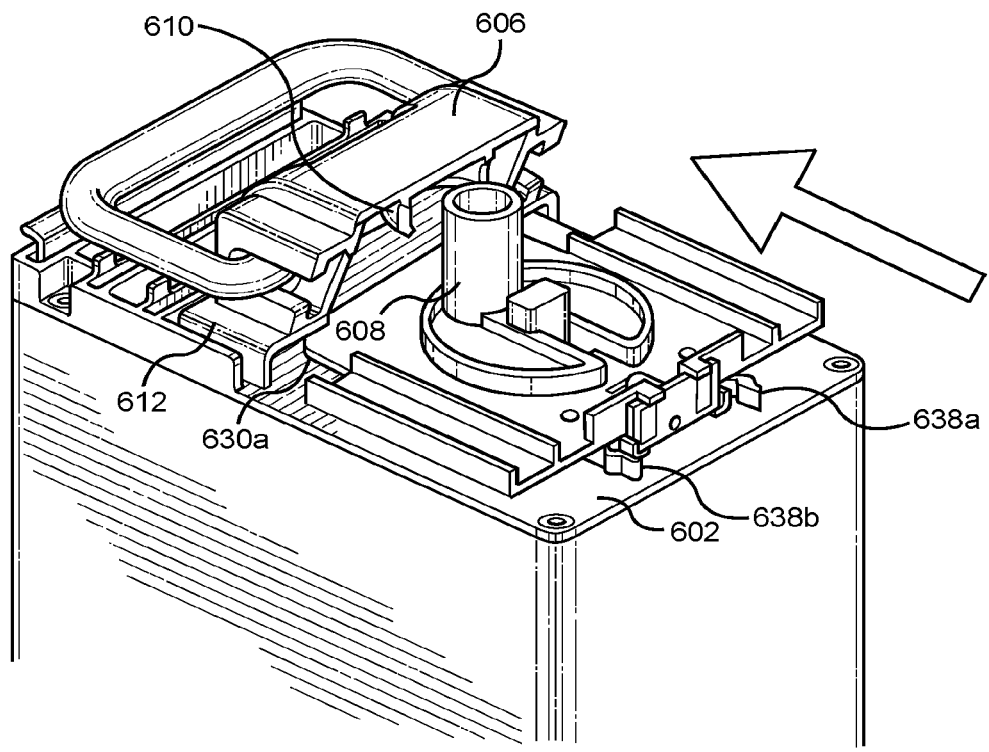

FIG. 6A and FIG. 6B show perspective views of a product dispensing module 600 according to an embodiment of the present invention. FIG. 6A shows a coupler lock 606, at a first coupler lock position (e.g., a locking position), engaging a module coupler 608 with the coupler receiver 610, and substantially preventing the module coupler 608 from rotating. Lock slider 612 is slidably engaged with coupler platform slider portion 630a (not visible in FIG. 6A). FIG. 6A further shows snap joint components 638a and 638b, for snapping into corresponding mating components of a modular vending machine (discussed in further detail with respect to FIG. 11). FIG. 6B shows the coupler lock 606 disengaged from the module coupler 608. As indicated by the arrow in FIG. 6B, the coupler lock 606 has moved or been moved from the first coupler lock position to a second coupler lock position (e.g., an unlocking position). The lock slider 612 has traversed (e.g., slid) along at least a portion of the coupler platform slider portion 630a, of sufficient distance to disengage the module coupler 608 from the coupler receiver 610. Accordingly, the module coupler 608 may be free to rotate or otherwise move and/or to be engaged with a drive assembly (not shown) (e.g., for dispensing products from a vertical conveyor).

In accordance with some embodiments, as discussed above with respect to FIG. 3, the product dispensing module 600 may comprise at least one removable panel 614 (e.g., stored using an opening 616 in the module platform 602).

Some embodiments provide for a modular vending machine comprising one or more types of module holding structures for receiving, coupling with, engaging with, installing and/or removably securing product dispensing modules. In some embodiments, a product dispensing module may be configured with one or more mounting structures that correspond to and are configured to removably engage with module holding structures of a modular vending machine. In some embodiments, as discussed in this disclosure, when a product dispensing module is installed in a modular vending machine, a drive assembly of a vending machine is coupled to a vertical conveyor of the product dispensing module. In some embodiments, as described in more detail below, a modular vending machine may comprise a plurality of positions for receiving and removably hanging, mounting or otherwise securing a respective product dispensing module such that the drive assembly of the modular vending machine can operate a vertical conveyor of the dispensing module to dispense products (e.g., under the control of the modular vending machine) and/or facilitate reading of a dispensing module's identifier (e.g., from a memory device of the dispensing module).

In one embodiment, a modular vending machine may comprise a plurality of positions for replaceable product dispensing modules, each position having at least one support shelf for engaging with (e.g., inserting into) a corresponding mounting structure of the module. In one example, the mounting structure of the module may comprise one or more snap joint components (e.g., cantilever snap joint components), and the modular vending machine may comprise the corresponding mating components of the snap joints. In another embodiment, a modular vending machine may comprise one or more clips, hole portions, snap joint components (e.g., for cantilever snap joints, annular snap joints, torsion snap joints, or combinations thereof), hooks, mounting posts, pegs, or the like, for engaging corresponding structure of a vertical product dispensing module in order to hang or otherwise mount the product dispensing module for dispensing products (e.g., a hole portion for receiving a hook or post of a product dispensing module to mount or hang a vertical product dispensing module; a snap joint clip for receiving a corresponding mounting post of a vertical product dispensing module snapped into the clip).

Figure 7:
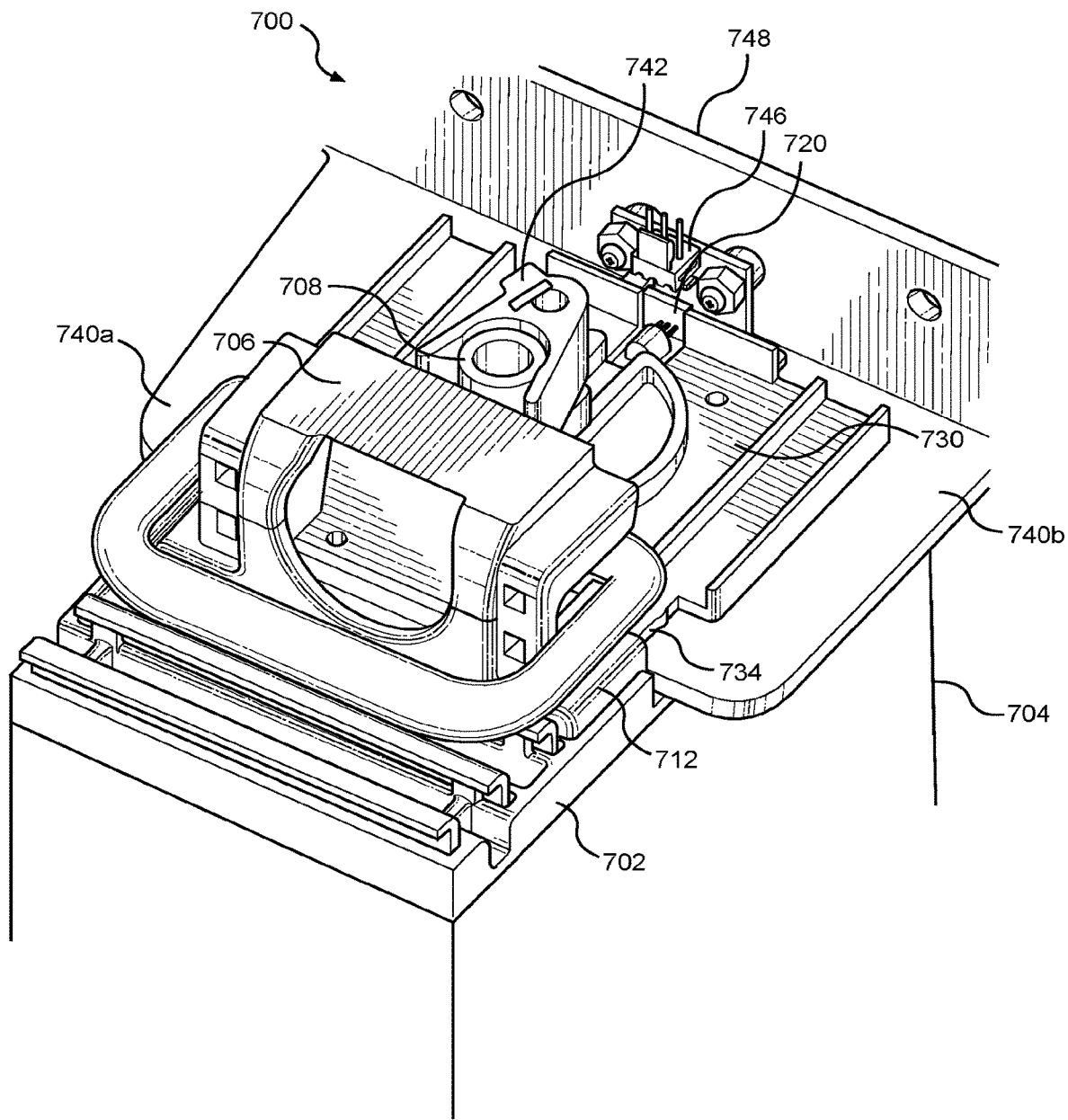
FIG. 7 is a perspective view of a modular vending machine coupled to a product dispensing module according to an embodiment of the present invention.

FIG. 7 shows a perspective view of an example modular vending machine 700 coupled to a product dispensing module 704 according to one embodiment of the present invention. As depicted in FIG. 7, in accordance with one embodiment the product dispensing module 704 may be mounted or installed in the modular vending machine 700 by engaging one or more types of mounting structures. In particular, in the embodiment of FIG. 7, when the product dispensing module 704 is mounted in the modular vending machine 700, the support shelves 740a, 740b of the modular vending machine are inserted into a corresponding gap between the coupler platform 730 and the container platform 702.

As discussed in this disclosure, in some embodiments a product dispensing module may comprise a coupler lock. In one example, as depicted in FIG. 7, installing the product dispensing module 704 causes the support shelf 740b on the one side and the support shelf 740a on the other side to contact the leading edge of the lock sliders 712, which causes the coupler lock 706 to slide or otherwise move away from and disengage from the module coupler 708. As also shown in FIG. 7, in accordance with some embodiments, a drive assembly coupler 742 (also referred to in this disclosure as a "u channel") engages the module coupler 708 when the product dispensing module 704 is installed. The drive assembly coupler 742 may, in some embodiments, be attached to a drive shaft (not shown) of a motor (not shown) installed above the product dispensing module. One or more of support shelves 740a, 740b may be connected to and/or integrated with a mounting structure 748 of the modular vending machine (e.g., to support the weight of the support shelves and the mounted product dispensing module).

It will be readily understood by one skilled in the art that although the example module coupler 708 of FIG. 7 has a substantially cylindrical shape and circular lateral cross section, and the drive assembly coupler 742 has a "u" shape configured to receive and engage the example module coupler, any shape of module coupler (e.g., triangular, square) and/or corresponding shape of drive assembly coupler may be utilized as deemed desirable for a particular implementation.

The example modular vending machine 700 further comprises, in accordance with some embodiments, a memory device 720 (e.g., installed as part of the product dispensing module 704) electronically connected via communications component 746 of the modular vending machine 700. Accordingly, information stored by memory device 720 may be read from and/or written to the memory device (e.g., by a controller device of the vending machine and/or a server).

Figure 8:
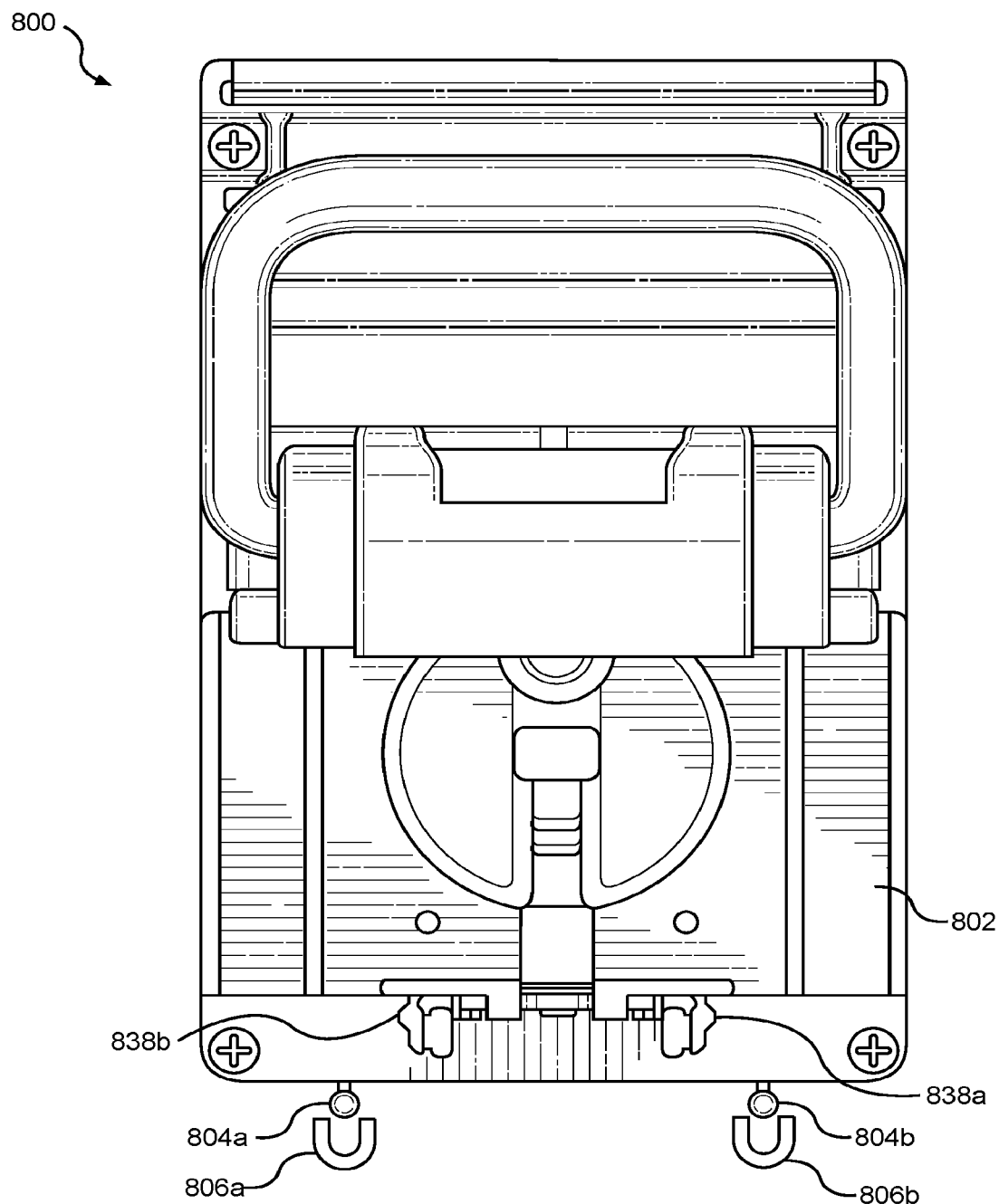
FIG. 8 is a top view of a product dispensing module according to an embodiment of the present invention.

FIG. 8 shows a top view of a product dispensing module 800 comprising another example of mounting structures for mounting a product dispensing module in a modular vending machine. As depicted in FIG., one or more mounting posts 804a, 804b (e.g., connected to the module coupler mechanism 802 and/or a container) according to one embodiment of the present invention. As depicted in FIG. 8, the mounting posts 804a, 804b may be configured to be releasably connected to mounting clips 806a, 806b, respectively. In one embodiment, the mounting clips 806a, 806b may be attached to a vending machine and/or docking station (not shown) and configured to have the mounting posts snapped into the clips to securely hold the product dispensing module 800 in the vending machine for dispensing purchased products. Similarly, as depicted in FIG. 8, alternatively or in addition, in some embodiments snap joint components 838a and 838b may be configured to snap fit into corresponding depressions in components of the vending machine. Although the mounting posts and snap joint components are depicted in FIG. 8 as being connected to or part of the product dispensing module, according to some embodiments one or more mounting clips or other type(s) of receiving components of a snap joint may be connected to or part of the product dispensing module, and one or more corresponding protruding components may be part of or connected to a vending machine and/or docking station.

D. Example Processes

According to some embodiments, processes described in this disclosure may be performed and/or implemented by and/or otherwise associated with one or more specialized and/or computerized processing devices (e.g., the devices of FIG. 1 described in this disclosure), specialized computers, computer terminals, computer servers, computer systems and/or networks, and/or any combinations thereof. In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described in this disclosure.

Figure 9:
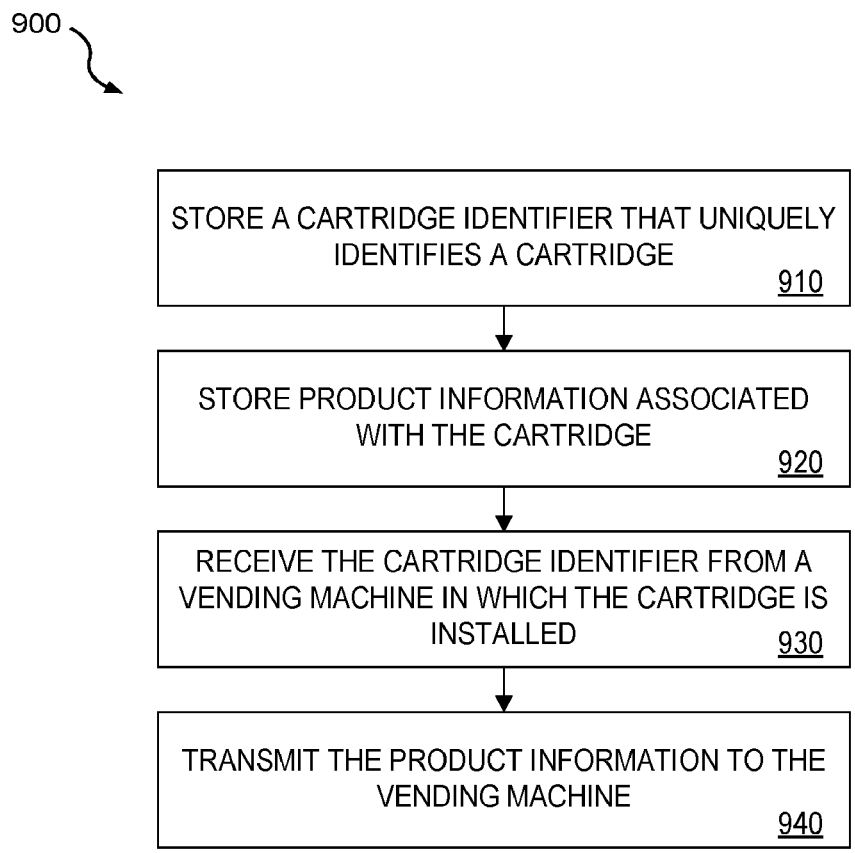
FIG. 9 is a flowchart of a method according to an embodiment of the present invention.

Referring now to FIG. 9, a flow diagram of a method 900 according to some embodiments is shown. The method 900 may be performed, for example, by a server computer. It should be noted that although some of the steps of method 900 may be described as being performed by a server computer while other steps are described as being performed by another computing device (e.g., a vending machine and/or product dispensing module), any and all of the steps may be performed by a single computing device. Further any steps described in this disclosure as being performed by a particular computing device may, in some embodiments, be performed by a human or another computing device as appropriate.

According to some embodiments, the method 900 may comprise storing a cartridge identifier that uniquely identifies a cartridge (e.g., a modular product cartridge), at 910. In one or more embodiments, storing a cartridge identifier may comprise one or more of: reading or otherwise receiving an indication of a cartridge identifier (e.g., from a user interface and/or docking station for stocking the cartridge), writing an identifier to a memory device (e.g., of a cartridge) and/or storing a cartridge identifier in a database (e.g., of a central server). In some alternative embodiments, the cartridge identifier need not be unique to a specific cartridge, but may identify a certain type or category of cartridge (e.g., all cartridges storing the same type of product may be designated with the same identifier). According to some embodiments, since a cartridge's unique ID chip may be pre-programmed by the chip manufacturer, ID chips may have to be read and then associated with the specific type of product that a cartridge will hold. According to other embodiments, IDs may be written, for example, to a memory of the cartridge.

According to some embodiments, the method 900 may comprise storing product information associated with the cartridge, at 920. In one or more embodiments, storing product information may comprise one or more of: reading or otherwise receiving an indication of information associated with one or more products stored in and/or designated for storage in a cartridge (e.g., from a user interface and/or docking station for stocking the cartridge), writing the product information to a memory device (e.g., of a cartridge) and/or storing production information in a database (e.g., of a central server).

According to some embodiments, the method 900 may comprise receiving the cartridge identifier from a vending machine in which the cartridge is installed, at 930, and transmitting the product information to the vending machine, at 940. In one embodiment, as described in this disclosure, a product cartridge may be installed in a modular vending machine (e.g., by a user at a partner location). A processor of the vending machine in (wired or wireless) communication with the memory device of the cartridge (e.g., an ID chip) may receive the cartridge identifier from the memory device and transmit the cartridge identifier to a central server (e.g., along with or as part of a request for information associated with the cartridge). The central server may look up product information, for example, in a product information database. According to some embodiments, product information may comprise a respective description for one or more types of products contained in the cartridge and/or respective price information associated with any products associated with the cartridge. The vending machine may display product information, for example, via an electronic display device of the vending machine (e.g., to advertise products available for purchases, including price information).

According to some embodiments, the central server may further be specially programmed to receive updated product information from the vending machine and/or storing updated product information in association with the cartridge identifier. In one example, the product information may comprise a number of items sold and/or remaining in the cartridge, and/or transaction information associated with products (e.g., information about product purchases made at the vending machine). In some embodiments, the central computer may be specially programmed to update pricing information for one or more types of products based on historical transaction information (e.g., based on sales trends, amount in inventory at vending machines, etc.).

E. Example Vending Machines

Figure 10A:
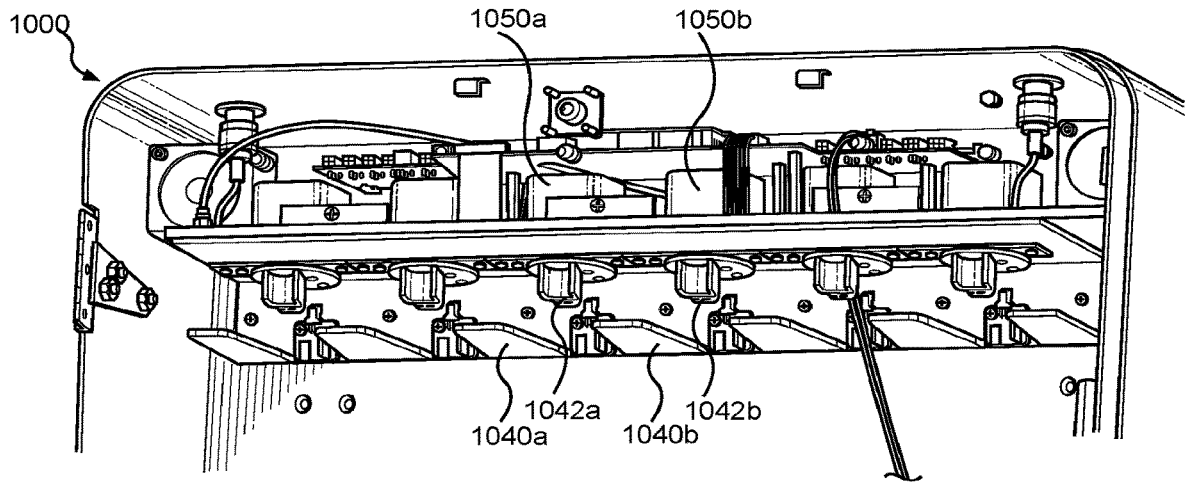
FIG. 10A and FIG. 10B are perspective views of a vending machine according to an embodiment of the present invention.
Figure 10B:
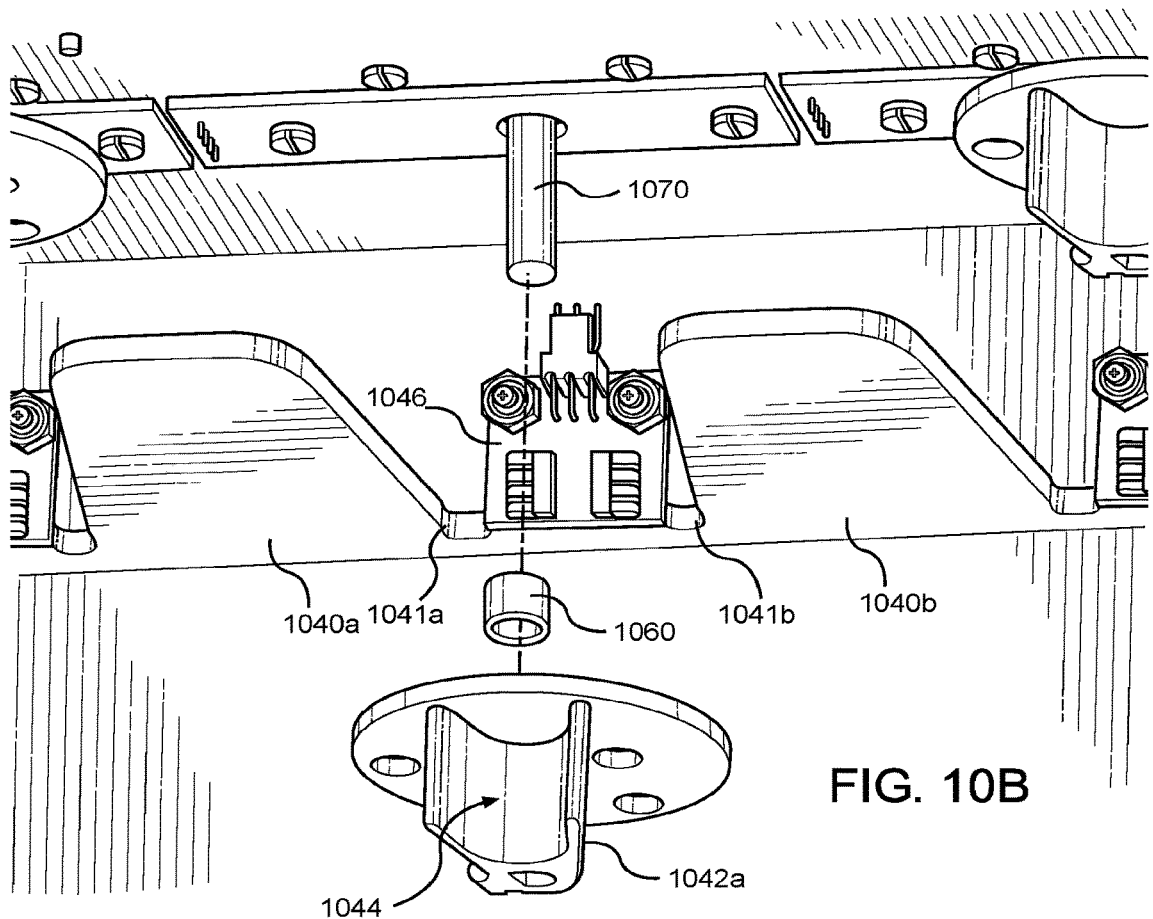

FIG. 10A and FIG. 10B are perspective views of an example modular vending machine 1000 according to some embodiments of the present invention. The modular vending machine 1000 preferably comprises one or more mounting and drive assembly systems, each such system configured to receive a respective product dispensing module (e.g., a replaceable product cartridge). As depicted in FIG. 10A, the example modular vending machine 1000 may comprise a casing or cabinet enclosing various components, including, without limitation: one or more module supporting shelves 1040a, 1040b; one or more drive assembly couplers 1042a, 1042b; and/or one or more motors 1050a, 1050b. As discussed with respect to FIG. 7, a product dispensing module may be mounted in the vending machine by engaging the module coupler mechanism with the supporting shelves 1040a, 1040b and the drive assembly coupler 1042a. FIG. 10B shows a close-up view of one mounting system of the modular vending machine 1000. The exploded view of the drive assembly coupler 1042a shows that the drive assembly may be mounted on a drive shaft 1070 (e.g., connected to motor 1050a of FIG. 10A), and, in accordance with some embodiments, may be separated from a mounting platform by a spacer 1060. The coupler receiver 1044 preferably is comprised to engage a correspondingly shaped module coupler (as discussed with respect to FIG. 7) of a product dispensing module.

As shown in FIG. 10B, the modular vending machine 1000 may further comprise, in accordance with some embodiments, a communications component 1046 for communicating and/or electrically connecting with a memory device of a mounted product dispensing module, and one or more mating components 1041a, 1041b (e.g., snap joint components with depressions for receiving corresponding snap-fitting hooks of a product dispensing module, such as snap joint components 638a, 638b of FIG. 6). As discussed in this disclosure, the mating components may ensure that the product dispensing module sits securely enough that any mechanical operation or movement of the vending machine (e.g., by being struck, by operation or vibration of a dispensing mechanism, or due to movement of a vehicle in which the vending machine is located) does not dislodge the product dispensing module. Accordingly, information stored by the memory device (e.g., a cartridge identifier) may be read from and/or written to the memory device (e.g., by a controller device of the vending machine and/or a server).

Figure 11:
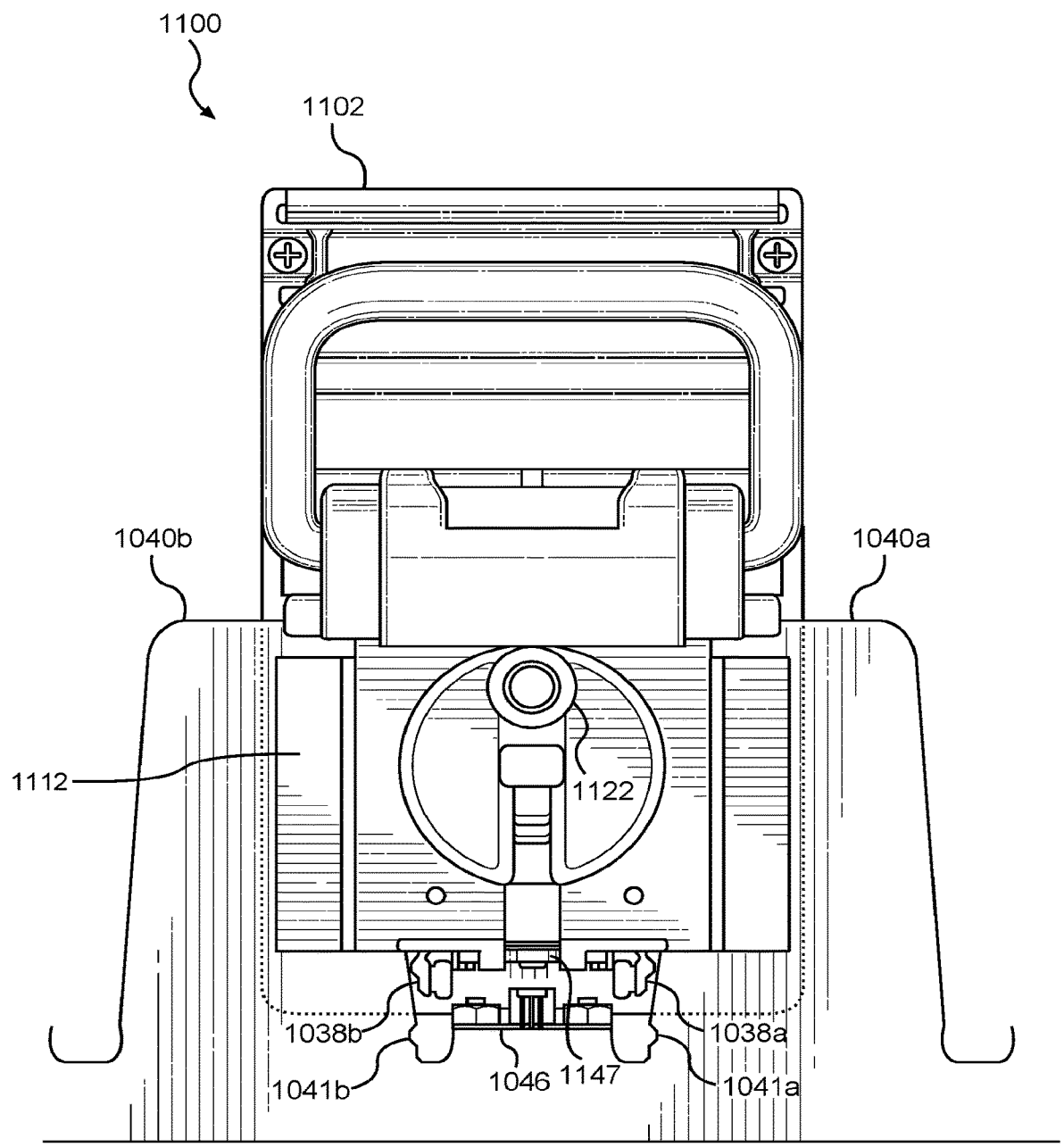
FIG. 11 is a perspective view of a product dispensing module being installed or removed from a modular vending machine according to an embodiment of the present invention.

FIG. 11 is a perspective view of an example product dispensing module 1102 being installed (or removed) from a modular vending machine according to an embodiment of the present invention. As depicted in the example system of FIG. 11, the product dispensing module 1102 comprises a coupler 1122 and snap joint components 1038a and 1038b. The product dispensing module 1102 may be mounted in the vending machine by engaging the module coupler mechanism 1112 with the supporting shelves 1040a, 1040b, which, in accordance with some embodiments, slide between the upper and lower platforms of the module coupler mechanism 1112 (see, for example, the example platforms 530 and 540 of FIG. 5). Further, supporting shelves 1040a, 1040b comprise mating components 1041a, 1041b, respectively, each having a corresponding depression for receiving the flexible snap joint components 1038a, 1038b, respectively. When the product dispensing module 1102 is installed in the modular vending machine, the flexible snap joint components 1038a, 1038b come into contact with the inner edges of the supporting shelves 1040a, 1040b and are deflected before catching in the depressions of the mating components 1041a, 1041b to help secure the product dispensing module 1102 in place. Once secured, the memory device 1147 preferably is in communication with the memory reader device 1046 (e.g., for receiving an identifier that identifies the product dispensing module). If the product dispensing module 1102 is to be removed, the configuration of the flexible snap joint components 1038a, 1038b allows them to flex when sufficient force is applied to disengage the dispensing module from the supporting shelves 1040a, 1040b.

Figure 12:
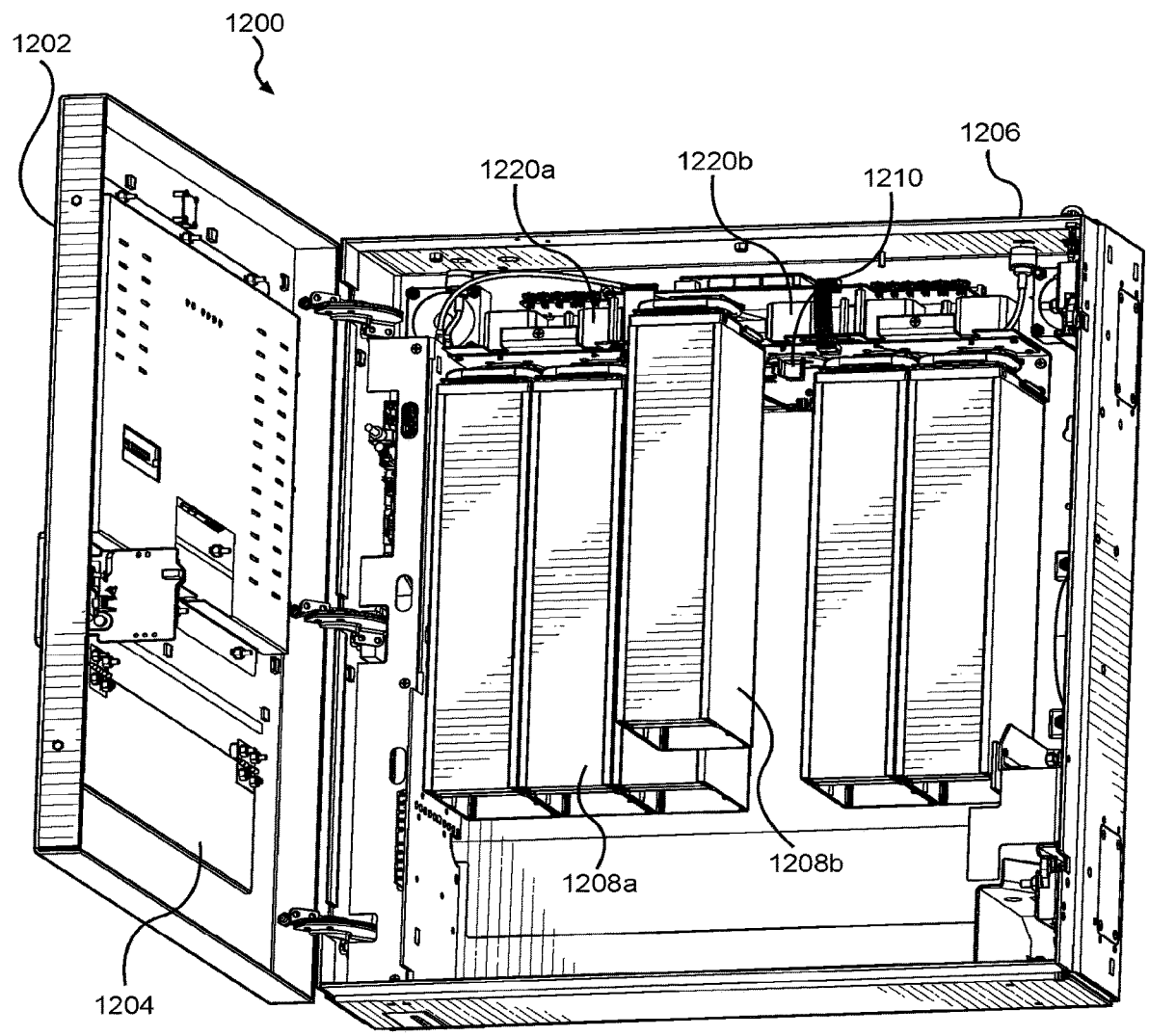
FIG. 12 is a perspective view of product dispensing modules installed in a modular vending machine according to an embodiment of the present invention.

FIG. 12 is a perspective view of a plurality of product dispensing modules installed in an example modular vending machine 1200, according to an embodiment of the present invention. The modular vending machine 1200 comprises a cabinet 1206 with a hinged door 1202 providing access to the interior of the vending machine (e.g., for maintenance and/or restocking purposes). In accordance with one embodiment, the door 1202 comprises a product delivery door 1204 for allowing a user access to a product delivery area at the bottom of the interior of the cabinet 1206, where products drop when dispensed by the installed product cartridges.

As depicted in FIG. 12, the modular vending machine 1200 comprises installed product dispensing module 1208a coupled to motor 1220a for dispensing products stored, for example, in a vertical conveyor of the module. As depicted, the example vending machine has a remaining spot to receive the product dispensing module 1208b by coupling a module coupler with the drive assembly coupler 1210, thereby connecting the module (and vertical conveyor) to the motor 1220b.

Figure 13:
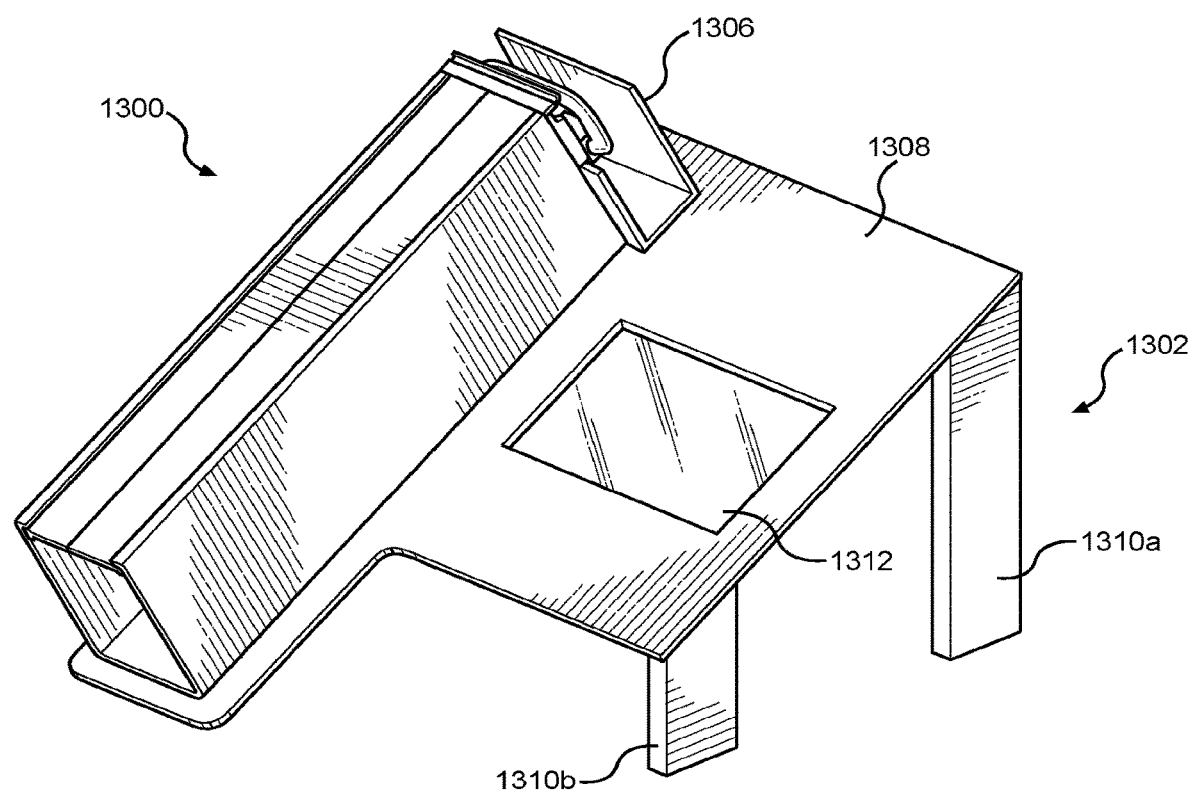
FIG. 13 is a perspective view of a docking station and a product dispensing module of a modular vending system according to an embodiment of the present invention.

FIG. 13 is a perspective view of a docking station 1302 and a product dispensing module 1300 (e.g., of a modular vending system) according to an embodiment of the present invention. As depicted in FIG. 13, a product dispensing module 1300 may be coupled to a docking station 1302 for, without limitation: stocking the product dispensing module and/or storing and/or updating information associated with the module. Various types of information and means for storing and/or updating such information in a modular vending system are described in this disclosure.

The docking station 1302 may comprise, in accordance with some embodiments, one or more of: a mounting system 1306, a support surface 1308, a display device and/or user interface 1312, and/or one or more supporting members 1310a, 1310b. The mounting system 1306 may comprise one or more supporting shelves, such as those described with respect to FIG. 7, for receiving the module coupler mechanism of the product dispensing module 1300. In one or more embodiments, the mounting system 1306 preferably comprises a microcontroller configured to read the cartridge identifier of an installed cartridge and to facilitate transfer of identifying information to a registration software program (e.g., hosted by a web server and running as a web-based application over the Internet).

According to some embodiments, the support surface 1308 preferably is slanted or at an angle (e.g., in a range of approximately 30 to 60 degrees) relative to a horizontal surface or floor (e.g., on which the docking station 1302 may be placed) in order to make stocking the product dispensing module 1300 (e.g., placing products in the product supporting positions of a vertical conveyor) more convenient. It will be readily understood that different configurations of the table surface may be implemented as deemed appropriate.

In one or more embodiments, the docking station 1302 may comprise a user interface 1312 (e.g., a touch screen device) via which a user may receive and/or input information to the modular vending machine system (e.g., cartridge information, product information and/or pricing information). In one embodiment, the docking station 1302 may comprise communications ports for communicating with one or more server computers, vending machines and/or product dispensing modules. According to some embodiments, the user interface 1312 may be embodied as a tablet computer connected to the Internet via a Wi-Fi connection.

According to some embodiments, the docking station may be used to initialize new cartridges into a modular vending system (e.g., after completion of a cartridge assembly process), and may also be used to associate products with specific cartridges during a restocking process.

F. Additional Embodiments

According to some embodiments, a vending machine and vending machine system are provided with a smaller size or form factor (e.g., for use in a vehicle). In one or more embodiments, the vending machine accepts product cartridges of approximately 7 inches (or less) in depth, and the cartridges include vertical coils holding products for dispensing vertically. For example, when vending an item a coil is rotated to release the lowest item held by the coil.

In some embodiments, some features of the vertical product cartridges and/or vending machine system may include one or more of:

male/female coupling system with "u-channel"
 integrated coupler cover/handle on cartridge
 adjustable panel on cartridge to accommodate products of different sizes for shipping and/or dispensing
 "slim" vertical cartridge includes vertical coil and is prestocked with product
 vending machine does not make actual product visible to customer—product information is identified by the vending machine based on a cartridge ID that identifies the cartridge According to some embodiments, a vending unit may comprise, but is not limited to, six cartridges, each containing a respective different product. In one embodiment, each cartridge has four sides: three solid and stationary walls, and one removable and/or adjustable front panel. In one embodiment, the front panel may be clear so that the product inside the cartridge is visible to potential purchasers. In some embodiments, each of the individual cartridges contains a variable number of products and a vended product is released via a coil mechanism coupled to a stepper motor of the vending unit. The coil also acts to hold the product in place during a non-vending state (e.g., while the cartridge is being transported).

According to some embodiments, on top of a product cartridge is a top cover that houses a coil support attached to a male coupler. In some embodiments, the male coupler is held and locked in place with a combined coupler cover/handle apparatus. When the male coupler is locked, for example, the coil remains stationary, thereby keeping products stationary and "locked down" within the cartridge during cartridge transport and/or handling (e.g., outside of a vending machine). Upon being inserted into a vending machine, the u-channel support of the vending unit into which the cartridge is inserted, disengages the coupler cover/handle apparatus, freeing the male coupler to rotate. At the exact same time, the insertion engages the male coupler on the top of the cartridge with a stationary female coupler attached to the end of a stepper motor on the main vending unit (inside the u-channel). The corresponding fit of the male coupler with the female coupler connects the motor to the coil, making the cartridge ready to vend product inside the vending unit.

In one or more embodiments, when inserted in a vending unit an ID chip mounted to the back of the cartridge makes contact with one or more electronic sensors on the back of the vending unit. This allows the main vending unit software to identify the cartridge and know what that particular cartridge contains. In one embodiment, the vending unit may displays information about the cartridge on a screen of the vending unit along with the product price, quantity, etc.

Applicants have recognized through testing that, in accordance with some embodiments, the coupling mechanism and recognition of a cartridge identifier (e.g., via an ID chip) allow the vending machine unit to be restocked with improved efficiency and reduces the restocking time. For example, in some timed trials up to six cartridges may be restocked in a vending unit in less than thirty seconds.

According to some embodiments, the modular vending machine system allows for the ability to update product information (e.g., via the Internet) for each specific networked vending machine (of a plurality of vending machines), regardless of location. In one or more embodiments, product and price input may be automatically updated at a vending machine via recognition of a cartridge identifier (e.g., upon installment of a cartridge in a vending unit).

In some embodiments, as discussed in this disclosure, each cartridge may include or be associated with an ID chip. Accordingly, when a cartridge is inserted into a vending machine, the vending machine software instructions may direct the processor to access a micro-controller to receive the serial number of the ID chip. This serial number is compared to a database of serial numbers which is stored on our server. There is a table of cartridge numbers which are cross-referenced with product data. This info for a specific cartridge is downloaded to the software. Upon download, all information on user interface is changed for that specific bay or slot. This same process occurs for each cartridge that is inserted into the machine. The user interface will now display the updated correct product name, product price, product image, and product quantity.

According to some embodiments, an ID chip for a cartridge preferably contains a unique serial number (e.g., a 48-bit number). When a cartridge is mounted in a docking station, software for the docking station instructs enables a microcontroller in electronic communication with the ID chip to read the serial number. The serial number is received by the processor in accordance with the software instructions and, in some embodiments, displayed on a display screen of the docking station. Information about the cartridge, such as its type and/or part number, may be selected by a user via the user interface. According to some embodiments, a cartridge type may be stored that indicates what type of coil is inserted in the cartridge. The part number may be a unique physical identifier printed on the cartridge.

In accordance with an example cartridge registration process, a serial number, cartridge type, and part number may identify a cartridge (e.g., an empty cartridge to be stocked). The cartridge information may be uploaded to a central database from a docking station. Product information may be associated with a cartridge through a cartridge docking station and/or another type of interface (e.g., a web-based interface). After product information is associated with a cartridge, then the cartridge is ready to be inserted into a vending unit.

According to some embodiments, a vending machine restocking process may comprise initiating a restocking mode, using vending machine software, which facilitates the reading of any serial numbers of any inserted cartridges. For example, the serial numbers may be read (e.g., sequentially) by a respective microcontroller and passed to the vending machine software. The vending machine software may then query a central database (e.g., over the Internet) using the serial number to find the corresponding cartridge. Upon locating the cartridge in the database, for example, the product information associated with the cartridge (e.g., stored during a registration process for that cartridge) may be downloaded to the vending machine. In some embodiments, the product information received may be stored in a local cache or other local memory device to be used for any one or more of a variety of functions.

In some embodiments, one or more products and/or cartridges may be associated with respective colors. In one example, an energy product with red trade dress may be associated with the color red in product database. In accordance with one embodiment, a vending machine may comprise lights (e.g., LED lights, RGB lights), configured in accordance with software instructions executed by a processor of the vending machine, to display (e.g., at a product dispensing area) the color or colors associated with a product that is in inventory and/or that is being dispensed. For example, the example "red" energy product, if purchased by a customer, may result in the vending machine causing the color red to be displayed. According to some embodiments, just prior to a product being released from the coil of the corresponding module, a processor may send a corresponding color number to a microcontroller. Based on the color number, the microcontroller may generate a color using RGB. In one example, a first purchased product's color is red, and a second purchased product's color is blue. When the first product is to be vended, lights inside the vending machine may turn red. Once the product is released, the lights inside the machine turn blue for vending the second product. In one embodiment, once all the products selected are dispensed successfully, the light inside the machine may turn back to a default color (e.g., white).

According to some embodiments, a user may be able to update the product description, images, price, quantity, and/or light color associated with a cartridge and/or product, using a software program. The software will communicate with the database and check for a change in any of the above parameters and then download the updated information.

After a cartridge's unique information has been uploaded to a central database, for example, product information may be associated with that cartridge through a web-based application or web portal. In one example, the cartridge may be found in the web portal through the physical cartridge identifier printed on the cartridge. When the cartridge's page on the web portal is found, its details may be modified (e.g., by an authorized user of the system). In one embodiment, a product to be associated with a given cartridge may be selected through user-selectable interface element (e.g., a drop down box) that contains all or a subset of the products within the system. In another example, the price of a product may be changed to be specific to all products in that cartridge. In another example, the number of products contained within a specific cartridge may be updated automatically, for example, through a text box located on the web portal screen, to indicate the actual quantity present.

According to some embodiments, program instructions executed by a vending machine may send a command to a microcontroller check how many cartridges have successfully made contact with the u-channels. This information may be sent to the database to store an indication of how many cartridges are installed within the particular vending machine.

G. Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention may be practiced with various modifications and alterations, such as structural, logical, software, and/or electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features that must be present in all embodiments.

Neither the Title (set forth at the beginning of the first page of this disclosure) nor the Abstract (set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term "process" or a like term. Accordingly, any reference in a claim to a "step" or "steps" of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

As used in this disclosure, a "user" may generally refer to any individual and/or entity that operates a device. Users may comprise, for example, customers, operators, partner location employees, etc.

Some embodiments may be associated with a "user device" or a "network device". As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the term "network component" may refer to a network device, or a component, piece, portion, or combination of a network device. Examples of network components may include a Static Random Access Memory (SRAM) device or module, a network processor, and a network communication path, connection, port, or cable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Examples of processors include, without limitation, Pentium™ by Intel, Athlon™ by AMD, or Apple Inc.'s A6 processor.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather can include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by, e.g., appropriately- and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated amongst a variety of devices.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A product dispensing module of a modular vending machine system, the product dispensing module comprising:
a vertical conveyor comprising a plurality of product supporting positions in a substantially vertical arrangement;
a coupler connected to the vertical conveyor, the coupler being configured for coupling with a drive assembly of a modular vending machine for operating the vertical conveyor; and
a container connected to the coupler, the container comprising at least one wall configured to retain products in the product supporting positions of the vertical conveyor,
the container being configured to removably engage with at least one supporting shelf of the modular vending machine such that when so removably engaged the container hangs vertically within the modular vending machine.

2. The product dispensing module of claim 1, wherein the vertical conveyor comprises a helical coil rotatably mounted in the container.

3. The product dispensing module of claim 1, wherein the at least one wall comprises:
a first side wall, a second side wall and a third side wall.

4. The product dispensing module of claim 1, wherein the container comprises an opening providing user access to the plurality of product supporting positions.

5. The product dispensing module of claim 1, the at least one wall of the container being configured to have one of:
a substantially rectangular lateral cross section,
a substantially square lateral cross section,
a substantially triangular lateral cross section, a substantially elliptical lateral cross section, or
a substantially circular lateral cross section.

6. The product dispensing module of claim 1, wherein the at least one wall comprises a top side wall of the container, wherein the vertical conveyor is connected to the top side wall.

7. The product dispensing module of claim 1, wherein at least one of the at least one wall comprises an opening, and wherein the vertical conveyor is connected to the coupler through the opening.

8. The product dispensing module of claim 1, wherein the at least one wall comprises at least one pair of grooves configured to receive a removable panel.

9. The product dispensing module of claim 1, wherein at least one of the at least one wall is adjustable to provide at least two different depths of the container for holding products of different sizes.

10. The product dispensing module of claim 1, further comprising:
a coupler lock attached to the container, the coupler lock being configured to substantially prevent movement of the coupler and the vertical conveyor when the coupler is not coupled to a drive assembly for operating the vertical conveyor, the coupler lock being further configured to allow movement of the coupler and the vertical conveyor to dispense products when the coupler is coupled to a drive assembly for operating the vertical conveyor.

11. The product dispensing module of claim 10, wherein the coupler is rotatable and wherein the coupler lock is configured to engage the coupler to prevent the coupler from rotating.

12. The product dispensing module of claim 10, wherein the coupler lock is movable from a first coupler lock position for engaging the coupler to prevent movement of the coupler to a second coupler lock position for disengaging the coupler to allow movement of the coupler.

13. The product dispensing module of claim 12, wherein the coupler lock is slidable from the first coupler lock position to the second lock position.

14. The product dispensing module of claim 12, the coupler lock being configured so coupling the coupler with a drive assembly for operating the vertical conveyor moves the coupler from the first coupler lock position to the second coupler lock position.

15. The product dispensing module of claim 12, the coupler lock being configured so coupling the coupler with a drive assembly for operating the vertical conveyor causes the drive assembly to push the coupler from the first coupler lock position to the second coupler lock position.

16. The product dispensing module of claim 1, further comprising a handle connected to the container.

* * * * *